(12) United States Patent
Bastug et al.

(10) Patent No.: US 12,126,529 B2
(45) Date of Patent: Oct. 22, 2024

(54) MULTI-TIER DETERMINISTIC NETWORKING

(71) Applicant: Nokia Solutions and Networks Oy, Espoo (FI)

(72) Inventors: Ejder Bastug, Paris (FR); Bilgehan Erman, Weehawken, NJ (US); Bruce Cilli, Atlantic Highlands, NJ (US); Sameerkumar Sharma, Holmdel, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 93 days.

(21) Appl. No.: 18/100,214

(22) Filed: Jan. 23, 2023

(65) Prior Publication Data

US 2023/0164071 A1    May 25, 2023

Related U.S. Application Data

(63) Continuation of application No. 17/184,108, filed on Feb. 24, 2021, now Pat. No. 11,575,599.

(51) Int. Cl.
*H04L 45/00* (2022.01)
*H04L 43/0852* (2022.01)
(Continued)

(52) U.S. Cl.
CPC .......... *H04L 45/70* (2013.01); *H04L 43/0858* (2013.01); *H04L 43/087* (2013.01); *H04L 45/04* (2013.01); *H04L 45/08* (2013.01)

(58) Field of Classification Search
None
See application file for complete search history.

(56) References Cited

U.S. PATENT DOCUMENTS

2006/0120303 A1   6/2006   Yarvis et al.
2018/0103094 A1   4/2018   Wetterwald et al.
(Continued)

OTHER PUBLICATIONS

Finn, N., et al., "Deterministic Networking Architecture," IETF, RFC 8655, Oct. 2019, 39 pages.
(Continued)

*Primary Examiner* — Anh Ngoc M Nguyen
(74) *Attorney, Agent, or Firm* — Tong, Rea, Bentley & Kim, LLC

(57) ABSTRACT

Various example embodiments for supporting multi-tier deterministic networking are presented. Various example embodiments for supporting multi-tier deterministic networking may be configured to support provisioning of deterministic flows in multi-tier deterministic networking. Various example embodiments for supporting multi-tier deterministic networking may be configured to support adaptive deterministic routing in multi-tier deterministic networks. Various example embodiments for supporting multi-tier deterministic networking may be configured to support score-based deterministic routing in multi-tier deterministic networks. Various example embodiments for supporting multi-tier deterministic networking may be configured to support adaptive deterministic routing and/or score-based deterministic routing in multi-tier deterministic networks based on analysis of a state representation for path and/or sub-path selection in multi-tier deterministic networks. Various example embodiments for supporting multi-tier deterministic networking may be configured to support hierarchical resource allocation and deallocation in multi-tier deterministic networking, optimal route finding in multi-tier deterministic networking, and so forth.

20 Claims, 18 Drawing Sheets

(51) Int. Cl.
  *H04L 43/087* (2022.01)
  *H04L 45/02* (2022.01)

(56) References Cited

U.S. PATENT DOCUMENTS

| | | | |
|---|---|---|---|
| 2019/0097884 A1* | 3/2019 | Thubert | H04L 43/16 |
| 2021/0021510 A1* | 1/2021 | Wetterwald | H04L 47/125 |
| 2021/0021512 A1 | 1/2021 | Erman et al. | |
| 2021/0058315 A1 | 2/2021 | Dong et al. | |
| 2022/0116311 A1* | 4/2022 | Mestery | H04L 45/021 |

OTHER PUBLICATIONS

Varga, B., et al., "DetNet Data Plane: IP Over IEEE 802.1 Time Sensitive Networking (TSN)," IETF, draft-ietf-detnet-ip-over-tsn-00, May 5, 2019, 21 pages.

Finn, N., et al., "DetNet Bounded Latency," IETF, draft-ietf-detnet-bounded-latency-00, Jul. 24, 2019, 27 pages.

Cisco, "Pathman," printed from https://github.com/CiscoDevNet/pathman-sr on Jan. 19, 2022, 13 pages.

Nasrallah, A., et al., "Ultra-Low Latency (ULL) Networks: The IEEE TSN and IETF DetNet Stanards and Related 5G ULL Research," IEEE Communications Surveys and Tutorials, vol. 21, Issue 1, Sep. 2018, 59 pages.

Ali, R., et al., "Hierarchical Deep Double Q-Routing," 2020 IEEE International Conference on Communications (ICC), Oct. 2019, 7 pages.

\* cited by examiner

MULTI-TIER DETERMINISTIC NETWORKING

CROSS-REFERENCE TO RELATED APPLICATIONS

This application is a continuation of U.S. patent application Ser. No. 17/184,108, filed on Feb. 24, 2021, and entitled MULTI-TIER DETERMINISTIC NETWORKING, which is hereby incorporated by reference herein in its entirety.

TECHNICAL FIELD

Various example embodiments relate generally to communication systems and, more particularly but not exclusively, to deterministic networking.

BACKGROUND

In various communication networks, various communications technologies may be used to support various types of communications.

SUMMARY

In at least some example embodiments, an apparatus includes at least one processor and at least one memory including a set of instructions, wherein the set of instructions is configured to, when executed by the at least one processor, cause the apparatus to receive, by an element of a communication network configured to support a set of interfaces of a set of nodes of the communication network, a request to resolve a routing request for a deterministic flow, determine, by the element based on state information for the set of interfaces, a selected sub-path for the deterministic flow, wherein the state information includes scheduled sub-path information for a set of scheduled deterministic flow sub-paths allocated on the set of interfaces and candidate sub-path information for a set of candidate deterministic flow sub-paths requested on the set of interfaces, and send, by the element, a response indicative of the selected sub-path for the deterministic flow. In at least some example embodiments, the scheduled sub-path information includes, for each of the interfaces, an indication of a set of deterministic resources allocated over time on the respective interface for the set of scheduled deterministic flow sub-paths. In at least some example embodiments, the candidate sub-path information includes, for each of the interfaces, an indication of a set of deterministic resources requested over time on the respective interface for the set of candidate deterministic flow sub-paths. In at least some example embodiments, the set of candidate deterministic flow sub-paths includes a subset of candidate deterministic flow sub-paths from a set of deterministic flow sub-path requests received by the element, and the state information includes a sub-path backlog parameter configured to represent a remaining portion of the candidate deterministic flow sub-paths from the set of deterministic flow sub-path requests received by the element. In at least some example embodiments, the state information includes at least one of latency requirement information or jitter requirement information. In at least some example embodiments, the state information includes at least one of a flow backlog metric, a local key performance indicator, or a global key performance indicator. In at least some example embodiments, to determine the selected sub-path for the deterministic flow, the set of instructions is configured to, when executed by the at least one processor, cause the apparatus to determine, by the element based on a sub-path determination agent supported by the element, a set of feasible sub-paths for the deterministic flow and select, by the element from the set of feasible sub-paths for the deterministic flow based on scoring of the set of feasible sub-paths for the deterministic flow by the sub-path determination agent, the selected sub-path for the deterministic flow. In at least some example embodiments, the sub-path determination agent is configured to determine the set of feasible sub-paths based on a neural network. In at least some example embodiments, the neural network includes a set of internal elements trained based on historical information, and the set of feasible sub-paths is determined based on a set of internal parameters quantifying weights between internal elements. In at least some example embodiments, the sub-path determination agent is configured to determine the set of feasible sub-paths based on a score calculator. In at least some example embodiments, the score calculator includes at least one of a function configured to score sub-paths based on respective durations of the sub-paths or a function configured to score sub-paths based on respective alignments between the sub-paths and resource availability. In at least some example embodiments, to select the selected sub-path for the deterministic flow, the set of instructions is configured to, when executed by the at least one processor, cause the apparatus to receive a vector including, for each of the feasible sub-paths in the set of feasible sub-paths, a recommendation identifying the respective feasible sub-path and a score associated with the respective feasible sub-path and select the selected sub-path based on the scores associated with the feasible sub-paths. In at least some example embodiments, the set of instructions is configured to, when executed by the at least one processor, cause the apparatus to send, by the element toward the sub-path determination agent, a state update signal configured to update the state information maintained by the sub-path determination agent, initiate, by the element toward the sub-path determination agent, a pick signal configured to request that the sub-path determination agent determine the set of feasible sub-paths for the deterministic flow, and receive, by the element from the sub-path determination agent, an action signal indicative of the selected sub-path for the deterministic flow. In at least some example embodiments, the response includes, for the selected sub-path for the deterministic flow, an indication of one or more interfaces, of one or more nodes, scheduled to support the selected sub-path for the deterministic flow. In at least some example embodiments, the response includes, for the selected sub-path for the deterministic flow, deterministic resource allocation information indicative of a set of deterministic resources to be allocated at one or more nodes for supporting the deterministic flow. In at least some example embodiments, the request is received from a node, and the response is sent toward the node. In at least some example embodiments, the request is received from a cluster leader of a cluster, and the response is sent toward the cluster leader of the cluster. In at least some example embodiments, the request is received from a controller associated with a cluster including the node, and the response is sent toward the controller associated with the cluster including the node. In at least some example embodiments, the set of instructions is configured to, when executed by the at least one processor, cause the apparatus to receive, by the element, an indication that the selected sub-flow has been released from the deterministic flow, determine, by the element based on a difference between an expected metric of the deterministic flow and an actual metric of the deterministic flow, a reward, and provide, by the element to a sub-path determination agent supported by the element, the reward.

In at least some example embodiments, a non-transitory computer-readable medium stores a set of instructions configured to cause an apparatus to receive, by an element of a communication network configured to support a set of interfaces of a set of nodes of the communication network, a request to resolve a routing request for a deterministic flow, determine, by the element based on state information for the set of interfaces, a selected sub-path for the deterministic flow, wherein the state information includes scheduled sub-path information for a set of scheduled deterministic flow sub-paths allocated on the set of interfaces and candidate sub-path information for a set of candidate deterministic flow sub-paths requested on the set of interfaces, and send, by the element, a response indicative of the selected sub-path for the deterministic flow. In at least some example embodiments, the scheduled sub-path information includes, for each of the interfaces, an indication of a set of deterministic resources allocated over time on the respective interface for the set of scheduled deterministic flow sub-paths. In at least some example embodiments, the candidate sub-path information includes, for each of the interfaces, an indication of a set of deterministic resources requested over time on the respective interface for the set of candidate deterministic flow sub-paths. In at least some example embodiments, the set of candidate deterministic flow sub-paths includes a subset of candidate deterministic flow sub-paths from a set of deterministic flow sub-path requests received by the element, and the state information includes a sub-path backlog parameter configured to represent a remaining portion of the candidate deterministic flow sub-paths from the set of deterministic flow sub-path requests received by the element. In at least some example embodiments, the state information includes at least one of latency requirement information or jitter requirement information. In at least some example embodiments, the state information includes at least one of a flow backlog metric, a local key performance indicator, or a global key performance indicator. In at least some example embodiments, to determine the selected sub-path for the deterministic flow, the set of instructions is configured to cause the apparatus to determine, by the element based on a sub-path determination agent supported by the element, a set of feasible sub-paths for the deterministic flow and select, by the element from the set of feasible sub-paths for the deterministic flow based on scoring of the set of feasible sub-paths for the deterministic flow by the sub-path determination agent, the selected sub-path for the deterministic flow. In at least some example embodiments, the sub-path determination agent is configured to determine the set of feasible sub-paths based on a neural network. In at least some example embodiments, the neural network includes a set of internal elements trained based on historical information, and the set of feasible sub-paths is determined based on a set of internal parameters quantifying weights between internal elements. In at least some example embodiments, the sub-path determination agent is configured to determine the set of feasible sub-paths based on a score calculator. In at least some example embodiments, the score calculator includes at least one of a function configured to score sub-paths based on respective durations of the sub-paths or a function configured to score sub-paths based on respective alignments between the sub-paths and resource availability. In at least some example embodiments, to select the selected sub-path for the deterministic flow, the set of instructions is configured to cause the apparatus to receive a vector including, for each of the feasible sub-paths in the set of feasible sub-paths, a recommendation identifying the respective feasible sub-path and a score associated with the respective feasible sub-path and select the selected sub-path based on the scores associated with the feasible sub-paths. In at least some example embodiments, the set of instructions is configured to cause the apparatus to send, by the element toward the sub-path determination agent, a state update signal configured to update the state information maintained by the sub-path determination agent, initiate, by the element toward the sub-path determination agent, a pick signal configured to request that the sub-path determination agent determine the set of feasible sub-paths for the deterministic flow, and receive, by the element from the sub-path determination agent, an action signal indicative of the selected sub-path for the deterministic flow. In at least some example embodiments, the response includes, for the selected sub-path for the deterministic flow, an indication of one or more interfaces, of one or more nodes, scheduled to support the selected sub-path for the deterministic flow. In at least some example embodiments, the response includes, for the selected sub-path for the deterministic flow, deterministic resource allocation information indicative of a set of deterministic resources to be allocated at one or more nodes for supporting the deterministic flow. In at least some example embodiments, the request is received from a node, and the response is sent toward the node. In at least some example embodiments, the request is received from a cluster leader of a cluster, and the response is sent toward the cluster leader of the cluster. In at least some example embodiments, the request is received from a controller associated with a cluster including the node, and the response is sent toward the controller associated with the cluster including the node. In at least some example embodiments, the set of instructions is configured to cause the apparatus to receive, by the element, an indication that the selected sub-flow has been released from the deterministic flow, determine, by the element based on a difference between an expected metric of the deterministic flow and an actual metric of the deterministic flow, a reward, and provide, by the element to a sub-path determination agent supported by the element, the reward.

In at least some example embodiments, a method includes receiving, by an element of a communication network configured to support a set of interfaces of a set of nodes of the communication network, a request to resolve a routing request for a deterministic flow, determining, by the element based on state information for the set of interfaces, a selected sub-path for the deterministic flow, wherein the state information includes scheduled sub-path information for a set of scheduled deterministic flow sub-paths allocated on the set of interfaces and candidate sub-path information for a set of candidate deterministic flow sub-paths requested on the set of interfaces, and sending by the element, a response indicative of the selected sub-path for the deterministic flow. In at least some example embodiments, the scheduled sub-path information includes, for each of the interfaces, an indication of a set of deterministic resources allocated over time on the respective interface for the set of scheduled deterministic flow sub-paths. In at least some example embodiments, the candidate sub-path information includes, for each of the interfaces, an indication of a set of deterministic resources requested over time on the respective interface for the set of candidate deterministic flow sub-paths. In at least some example embodiments, the set of candidate deterministic flow sub-paths includes a subset of candidate deterministic flow sub-paths from a set of deterministic flow sub-path requests received by the element, and the state information includes a sub-path backlog parameter configured to represent a remaining portion of the candidate deterministic flow sub-paths from the set of deterministic flow sub-path requests received by the element. In at least some example embodiments, the state information includes at least one of latency requirement information or jitter requirement information. In at least some example embodiments, the state information includes at least one of a flow backlog metric, a local key performance indicator, or a global key performance indicator. In at least some example embodiments, determining the selected sub-path for the deterministic flow includes determining, by the element based on a sub-path determination agent supported by the element, a set of feasible sub-paths for the deterministic flow and selecting, by the element from the set of feasible sub-paths for the deterministic flow based on scoring of the set of feasible sub-paths for the deterministic flow by the sub-path determination agent, the selected sub-path for the deterministic flow. In at least some example embodiments, the sub-path determination agent is configured to determine the set of feasible sub-paths based on a neural network. In at least some example embodiments, the neural network includes a set of internal elements trained based on historical information, and the set of feasible sub-paths is determined based on a set of internal parameters quantifying weights between internal elements. In at least some example embodiments, the sub-path determination agent is configured to determine the set of feasible sub-paths based on a score calculator. In at least some example embodiments, the score calculator includes at least one of a function configured to score sub-paths based on respective durations of the sub-paths or a function configured to score sub-paths based on respective alignments between the sub-paths and resource availability. In at least some example embodiments, selecting the selected sub-path for the deterministic flow includes receiving a vector including, for each of the feasible sub-paths in the set of feasible sub-paths, a recommendation identifying the respective feasible sub-path and a score associated with the respective feasible sub-path and selecting the selected sub-path based on the scores associated with the feasible sub-paths. In at least some example embodiments, the method includes sending, by the element toward the sub-path determination agent, a state update signal configured to update the state information maintained by the sub-path determination agent, initiating, by the element toward the sub-path determination agent, a pick signal configured to request that the sub-path determination agent determine the set of feasible sub-paths for the deterministic flow, and receiving, by the element from the sub-path determination agent, an action signal indicative of the selected sub-path for the deterministic flow. In at least some example embodiments, the response includes, for the selected sub-path for the deterministic flow, an indication of one or more interfaces, of one or more nodes, scheduled to support the selected sub-path for the deterministic flow. In at least some example embodiments, the response includes, for the selected sub-path for the deterministic flow, deterministic resource allocation information indicative of a set of deterministic resources to be allocated at one or more nodes for supporting the deterministic flow. In at least some example embodiments, the request is received from a node, and the response is sent toward the node. In at least some example embodiments, the request is received from a cluster leader of a cluster, and the response is sent toward the cluster leader of the cluster. In at least some example embodiments, the request is received from a controller associated with a cluster including the node, and the response is sent toward the controller associated with the cluster including the node. In at least some example embodiments, the method includes receiving, by the element, an indication that the selected sub-flow has been released from the deterministic flow, determining, by the element based on a difference between an expected metric of the deterministic flow and an actual metric of the deterministic flow, a reward, and providing, by the element to a sub-path determination agent supported by the element, the reward.

In at least some example embodiments, an apparatus includes means for receiving, by an element of a communication network configured to support a set of interfaces of a set of nodes of the communication network, a request to resolve a routing request for a deterministic flow, means for determining, by the element based on state information for the set of interfaces, a selected sub-path for the deterministic flow, wherein the state information includes scheduled sub-path information for a set of scheduled deterministic flow sub-paths allocated on the set of interfaces and candidate sub-path information for a set of candidate deterministic flow sub-paths requested on the set of interfaces, and means for sending by the element, a response indicative of the selected sub-path for the deterministic flow. In at least some example embodiments, the scheduled sub-path information includes, for each of the interfaces, an indication of a set of deterministic resources allocated over time on the respective interface for the set of scheduled deterministic flow sub-paths. In at least some example embodiments, the candidate sub-path information includes, for each of the interfaces, an indication of a set of deterministic resources requested over time on the respective interface for the set of candidate deterministic flow sub-paths. In at least some example embodiments, the set of candidate deterministic flow sub-paths includes a subset of candidate deterministic flow sub-paths from a set of deterministic flow sub-path requests received by the element, and the state information includes a sub-path backlog parameter configured to represent a remaining portion of the candidate deterministic flow sub-paths from the set of deterministic flow sub-path requests received by the element. In at least some example embodiments, the state information includes at least one of latency requirement information or jitter requirement information. In at least some example embodiments, the state information includes at least one of a flow backlog metric, a local key performance indicator, or a global key performance indicator. In at least some example embodiments, the means for determining the selected sub-path for the deterministic flow includes means for determining, by the element based on a sub-path determination agent supported by the element, a set of feasible sub-paths for the deterministic flow and means for selecting, by the element from the set of feasible sub-paths for the deterministic flow based on scoring of the set of feasible sub-paths for the deterministic flow by the sub-path determination agent, the selected sub-path for the deterministic flow. In at least some example embodiments, the sub-path determination agent is configured to determine the set of feasible sub-paths based on a neural network. In at least some example embodiments, the neural network includes a set of internal elements trained based on historical information, and the set of feasible sub-paths is determined based on a set of internal parameters quantifying weights between internal elements. In at least some example embodiments, the sub-path determination agent is configured to determine the set of feasible sub-paths based on a score calculator. In at least some example embodiments, the score calculator includes at least one of a function configured to score sub-paths based on respective durations of the sub-paths or a function configured to score sub-paths based on respective alignments between the sub-paths and resource availability. In at least some example embodiments, the means for selecting the selected sub-path for the deterministic flow includes means for receiving a vector including, for each of the feasible sub-paths in the set of feasible sub-paths, a recommendation identifying the respective feasible sub-path and a score associated with the respective feasible sub-path and means for selecting the selected sub-path based on the scores associated with the feasible sub-paths. In at least some example embodiments, the apparatus includes means for sending, by the element toward the sub-path determination agent, a state update signal configured to update the state information maintained by the sub-path determination agent, means for initiating, by the element toward the sub-path determination agent, a pick signal configured to request that the sub-path determination agent determine the set of feasible sub-paths for the deterministic flow, and means for receiving, by the element from the sub-path determination agent, an action signal indicative of the selected sub-path for the deterministic flow. In at least some example embodiments, the response includes, for the selected sub-path for the deterministic flow, an indication of one or more interfaces, of one or more nodes, scheduled to support the selected sub-path for the deterministic flow. In at least some example embodiments, the response includes, for the selected sub-path for the deterministic flow, deterministic resource allocation information indicative of a set of deterministic resources to be allocated at one or more nodes for supporting the deterministic flow. In at least some example embodiments, the request is received from a node, and the response is sent toward the node. In at least some example embodiments, the request is received from a cluster leader of a cluster, and the response is sent toward the cluster leader of the cluster. In at least some example embodiments, the request is received from a controller associated with a cluster including the node, and the response is sent toward the controller associated with the cluster including the node. In at least some example embodiments, the apparatus includes means for receiving, by the element, an indication that the selected sub-flow has been released from the deterministic flow, means for determining, by the element based on a difference between an expected metric of the deterministic flow and an actual metric of the deterministic flow, a reward, and means for providing, by the element to a sub-path determination agent supported by the element, the reward.

In at least some example embodiments, an apparatus includes at least one processor and at least one memory including a set of instructions, wherein the set of instructions is configured to, when executed by the at least one processor, cause the apparatus to receive, by a cluster leader of a cluster of nodes of a multi-tier communication network, a request for a path for a deterministic flow, determine, by the cluster leader of the cluster of nodes, a set of deterministic resources to be allocated at one or more nodes of the cluster of nodes for supporting the deterministic flow within the multi-tier communication network, and provide, by the cluster leader of the cluster of nodes, a response indicative of the set of deterministic resources to be allocated at one or more nodes of the cluster of nodes for supporting the deterministic flow within the multi-tier communication network. In at least some example embodiments, a non-transitory computer-readable medium stores a set of instructions configured to cause an apparatus to receive, by a cluster leader of a cluster of nodes of a multi-tier communication network, a request for a path for a deterministic flow, determine, by the cluster leader of the cluster of nodes, a set of deterministic resources to be allocated at one or more nodes of the cluster of nodes for supporting the deterministic flow within the multi-tier communication network, and provide, by the cluster leader of the cluster of nodes, a response indicative of the set of deterministic resources to be allocated at one or more nodes of the cluster of nodes for supporting the deterministic flow within the multi-tier communication network. In at least some example embodiments, a method includes receiving, by a cluster leader of a cluster of nodes of a multi-tier communication network, a request for a path for a deterministic flow, determining, by the cluster leader of the cluster of nodes, a set of deterministic resources to be allocated at one or more nodes of the cluster of nodes for supporting the deterministic flow within the multi-tier communication network, and providing, by the cluster leader of the cluster of nodes, a response indicative of the set of deterministic resources to be allocated at one or more nodes of the cluster of nodes for supporting the deterministic flow within the multi-tier communication network. In at least some example embodiments, an apparatus includes means for receiving, by a cluster leader of a cluster of nodes of a multi-tier communication network, a request for a path for a deterministic flow, means for determining, by the cluster leader of the cluster of nodes, a set of deterministic resources to be allocated at one or more nodes of the cluster of nodes for supporting the deterministic flow within the multi-tier communication network, and means for providing, by the cluster leader of the cluster of nodes, a response indicative of the set of deterministic resources to be allocated at one or more nodes of the cluster of nodes for supporting the deterministic flow within the multi-tier communication network.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Various example embodiments for supporting multi-tier deterministic networking are presented. Various example embodiments for supporting multi-tier deterministic networking may be configured to support provisioning of deterministic flows in multi-tier deterministic networking. Various example embodiments for supporting multi-tier deterministic networking may be configured to support adaptive deterministic routing in multi-tier deterministic networks. Various example embodiments for supporting multi-tier deterministic networking may be configured to support score-based deterministic routing in multi-tier deterministic networks. Various example embodiments for supporting multi-tier deterministic networking may be configured to support adaptive deterministic routing and/or score-based deterministic routing in multi-tier deterministic networks based on analysis of a state representation for path and/or sub-path selection in multi-tier deterministic networks. Various example embodiments for supporting multi-tier deterministic networking may be configured to support hierarchical resource allocation and deallocation in multi-tier deterministic networking, optimal route finding in multi-tier deterministic networking, or the like, as well as various combinations thereof. Various example embodiments for supporting multi-tier deterministic networking may be configured to support multi-tier deterministic networking which may be based on various deterministic networking capabilities (e.g., Institute of Electrical and Electronics Engineers (IEEE) Time-Sensitive Networking (TSN), Internet Engineering Task Force (IETF) Deterministic Networking (DetNet), or the like). Various example embodiments for supporting multi-tier deterministic networking may be configured to support multi-tier deterministic networking that may be based on various network topologies. Various example embodiments for supporting multi-tier deterministic networking may be configured to support multi-tier deterministic networking that may be applied in various contexts for ensuring bounded performance for various metrics (e.g., supporting autonomous vehicles, factory automation, communication at mining sites, or the like). It will be appreciated that these as well as various other example embodiments, and associated advantages or potential advantages, may be further understood by first considering a communication system that is configured to support multi-tier deterministic networking.

Figure 1:
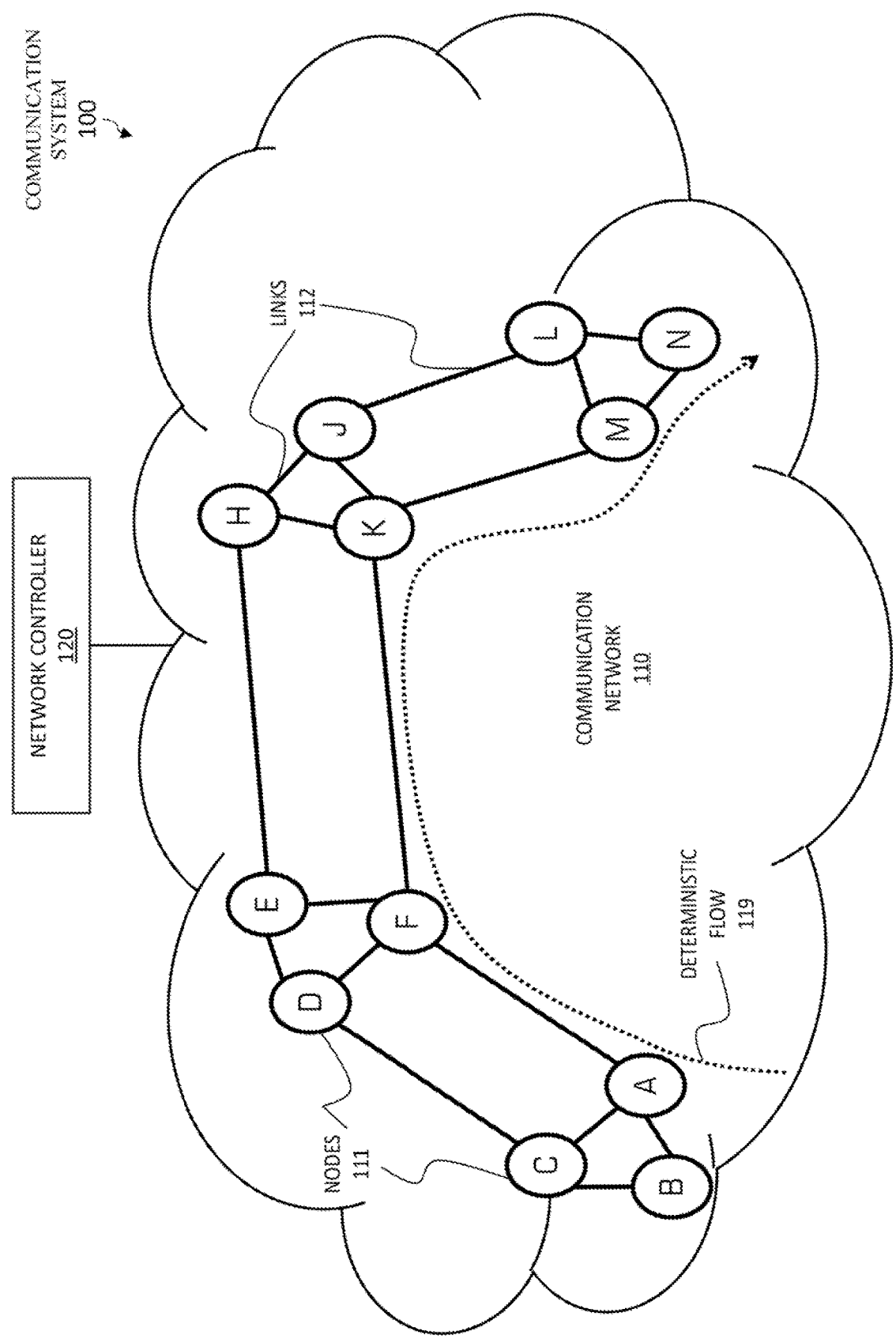
FIG. 1 depicts an example embodiment of a communication system configured to support deterministic networking.

FIG. 1 depicts an example embodiment of a communication system configured to support deterministic networking.

The communication system 100 includes a communication network 110 and a network controller 120. The communication network 110 including a set of nodes 111 and a set of communication links 112. It is noted that, for ease of reference, the nodes 111 are labeled using letters as follows: A, B, C, D, E, F, H, J, K, L, M, and N. The communication network 110 may be a physical network or a virtual network and, thus, the nodes 111 may include physical nodes or virtual nodes (or a combination thereof). The communication network 110 may be configured to support non-deterministic communications and deterministic communications. The nodes 111 may include various types of nodes which may be configured to support non-deterministic and/or deterministic communications, such as routers, switches, or the like, as well as various combinations thereof. The links 112 may include various types of communication links which may support communications between the nodes 111. The network controller 120 is configured to provide various control functions for the communication network 110 (e.g., network provisioning functions, network monitoring functions, or the like, as well as various combinations thereof. It will be appreciated that the communication network 110, although primarily presented with respect to specific types, numbers, and arrangements of nodes 111 and links 112, may include various other types, numbers, and/or arrangements of nodes 111 and links 112.

The communication network 110 is configured to support deterministic communications. The communication network 110 may be configured to support deterministic communications based on deterministic networking. The deterministic networking may be configured to support bounded performance guarantees based on various performance measures (e.g., latency, jitter, or the like, as well as various combinations thereof). The deterministic communications may be based on IEEE TSN, IETF DetNet, or the like, as well as various combinations thereof. For example, various example embodiments may be configured to be compliant with and provide extensions to such deterministic communications capabilities, support extension of such deterministic communications capabilities to more general settings, and various other use cases which also may include support for broader deployment of deterministic networking. For example, various example embodiments may be configured to support signaling and control mechanisms that allow control and data planes of deterministic flows to integrate into existing deterministic networks that are based on such deterministic communications capabilities. For example, various example embodiments may be configured to support multi-tier deterministic networking where both IEEE TSN and IETF DetNet are used to support deterministic networking, such as where IEEE TSN is used for lower layers of the network protocol stack (e.g., Layers 1-2) and IETF DetNet is used for higher layers of the network protocol stack (e.g., Layers 2-3).

The communication network 110 includes a deterministic flow 119 that is established through nodes A↔F↔K↔M↔N. The deterministic flow 119 may be configured to support bounded performance guarantees (e.g., latency, jitter, reliability, or the like, as well as various combinations thereof). The deterministic flow 119 may be established in various ways. The deterministic flow 119 may be established based on one or more deterministic networking standards. For example, using DetNet, the deterministic flow 119 may be established by performing any configuration needed by the DetNet transit nodes in the network for the class(es) of service to be provided (including one or more classes of DetNet service), computing the resource requirements of the new DetNet flow (e.g., in terms of required bandwidth and other types of resources), finding the path that the DetNet flow will take through the network from the source to the destination (point-to-point) or destinations (point-to-multipoint), computing the worst-case end-to-end latency for the DetNet flow, determining whether sufficient resources are available for that flow to guarantee the required latency and to provide zero congestion loss, and committing resources to the flow (e.g., which may or may not include adjusting the parameters that control the filtering and/or queuing mechanisms at each hop along the path of the DetNet flow). The deterministic flow 119 may be established based on clustering of the communication network 110 to form a multi-tier hierarchical network, as discussed further herein with respect to FIG. 2 and FIG. 3. It will be appreciated that use of a multi-tier hierarchical network to support establishment of deterministic flows may be further understood by first considering various example embodiments for clustering communications networks to form multi-tier deterministic networks.

Various example embodiments for supporting multi-tier deterministic networking are presented. In a given multi-tier hierarchical network, allocation of deterministic resources in the multi-tier hierarchical network may be supported. In a given multi-tier hierarchical network, hierarchical deterministic flow provisioning and initiation may be tailored based on use of clustering for the multi-tier hierarchical network. In a given multi-tier hierarchical network, each node (e.g., router) that is configured to support allocation of deterministic resources may be configured to operate according to a role and using a hierarchical coordination protocol that is configured to maintain a balance between centralized and decentralized operation, thereby enabling determinism to be applied to larger geographic areas where various deterministic measures (e.g., latency, jitter, or the like) may be applied for various purposes (e.g., applications, services, or the like). These and various other example embodiments for supporting allocation of deterministic resources in multi-tier hierarchical networks may be further understood by considering the following communication network.

The communication network, which may be either physical or virtual, includes N communication nodes connected via unidirectional communication links. The representation of this network may be given by a directed graph $\mathcal{G} = ((\mathcal{V}, \mathcal{E}))$, where $\mathcal{V}$ includes the set of nodes and $\mathcal{E}$ includes available links (e.g., unidirectional links between the nodes). The network is configured to provide deterministic communication services to various customers (e.g., industrial customers, end-users applications, and so forth) for various use cases (e.g., factories, mining sites, remote surgery, concert areas, low latency financial services, or the like). The nodes in the network are capable of routing their own packets or intermediate packets using various routing techniques (e.g., segment routing, source routing, or the like, as well as various combinations thereof) over protocol stacks which may support various types of protocols (e.g., IP, MPLS, or the like, as well as various combinations thereof). The protocol stacks also may support deterministic communication guarantees for various parameters (e.g., latency, jitter, reliability, or the like, as well as various combinations thereof) based on various technologies configured to support such deterministic communication guarantees (e.g., IETF DetNet, IEEE TSN, communication stacks that are capable of supporting deterministic communication guarantees, or the like, as well as various combinations thereof). It will be appreciated that, although primarily presented with respect to use of a unidirectional links and a directed graph, various example embodiments for supporting multi-tier deterministic networking also may be applied for bidirectional links, undirected graphs, or the like, as well as various combinations thereof.

The communication network is formed into K tiers with each tier k hierarchically forming $C_k$ number of non-overlapping clusters of nodes or parent clusters (if defined), which may be performed either statically or automatically according to a clustering mechanism. More precisely, for the highest tier k=1 with $C_k$ clusters whose nodes are assigned, the process keeps repeating for sub-tiers k+1, k+2, . . . , K, each time a given cluster of tier k forms sub-clusters from existing nodes of that cluster at tier k. The whole process results in a multi-tier hierarchical clustered network, whose aim to achieve deterministic performance with a balance between centralized-decentralized administration and computation-communication complexity. In such a network, one can observe that the highest tier (i.e., k=1) has fewer or equal number of clusters compared to lower tiers, such as $C_1 \leq C_2 \leq \ldots \leq C_K$. The nodes in the network have knowledge of their clusters for each tier. The network operator might opt to choose (or not to choose), either statically or algorithmically, to form clusters in a given tier, if the number of nodes in that tier is lower than a predefined threshold. In the lowest tier (i.e., k=K), it may be assumed that each cluster has a designated cluster leader (which also may be referred to as a group leader) that is in charge of cold start of nodes within the cluster, and handles some part of control plane procedures required in its cluster at the lowest tier. The designated cluster leader can be assigned by a central or local entity, either statically or autonomously (using statistical tools and machine learning techniques), based on some design metrics and negotiation process. The cluster leaders may be connected to SDN controllers (e.g., for signaling, bootstrapping, control messaging, or the like, as well as various combinations thereof), which in turn may be connected to other SDN controllers in a hierarchical manner until reaching the top network controller.

Figure 2:
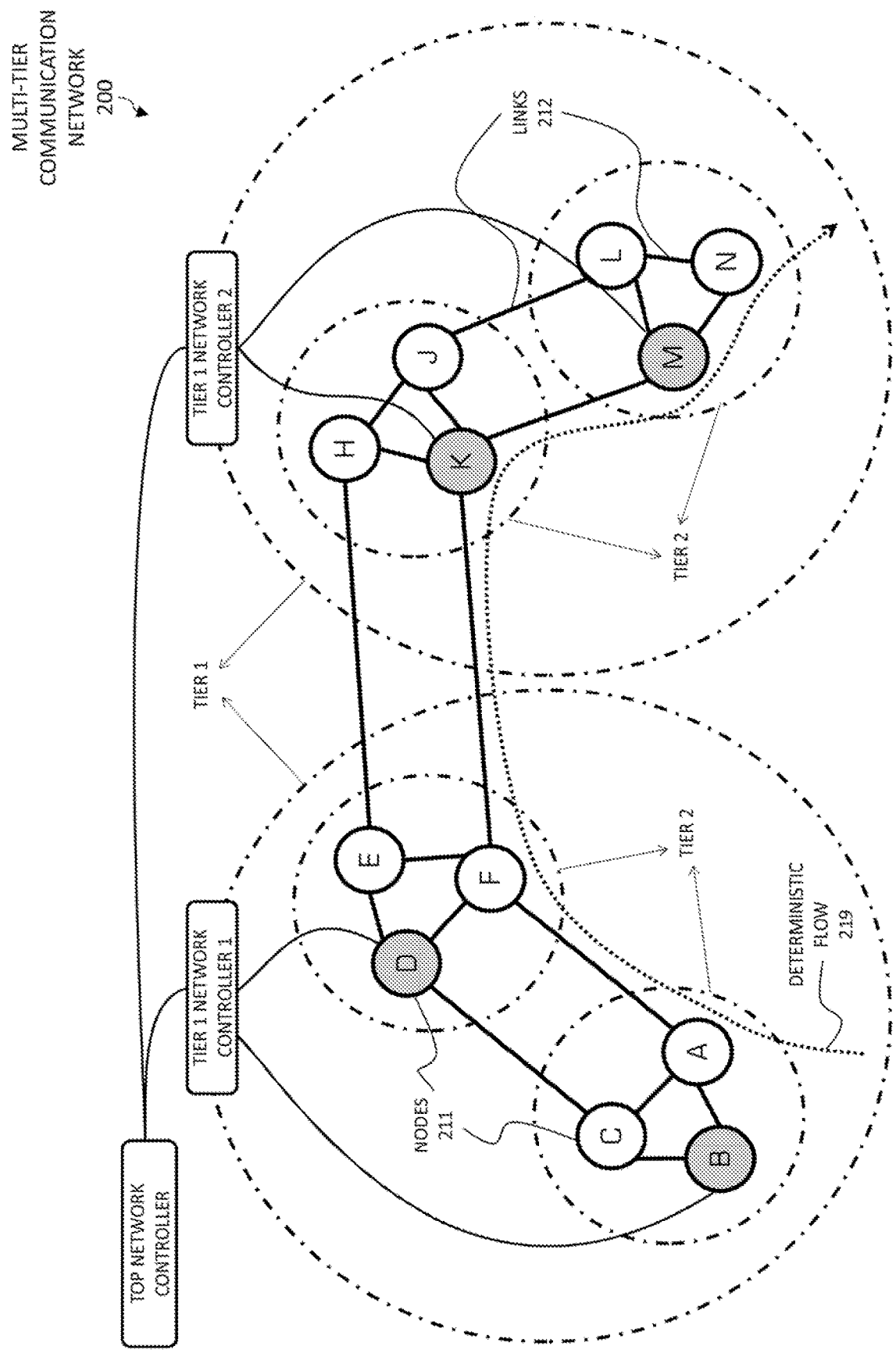
FIG. 2 depicts an example embodiment of multi-tier hierarchical network configured to support deterministic networking.
Figure 3:
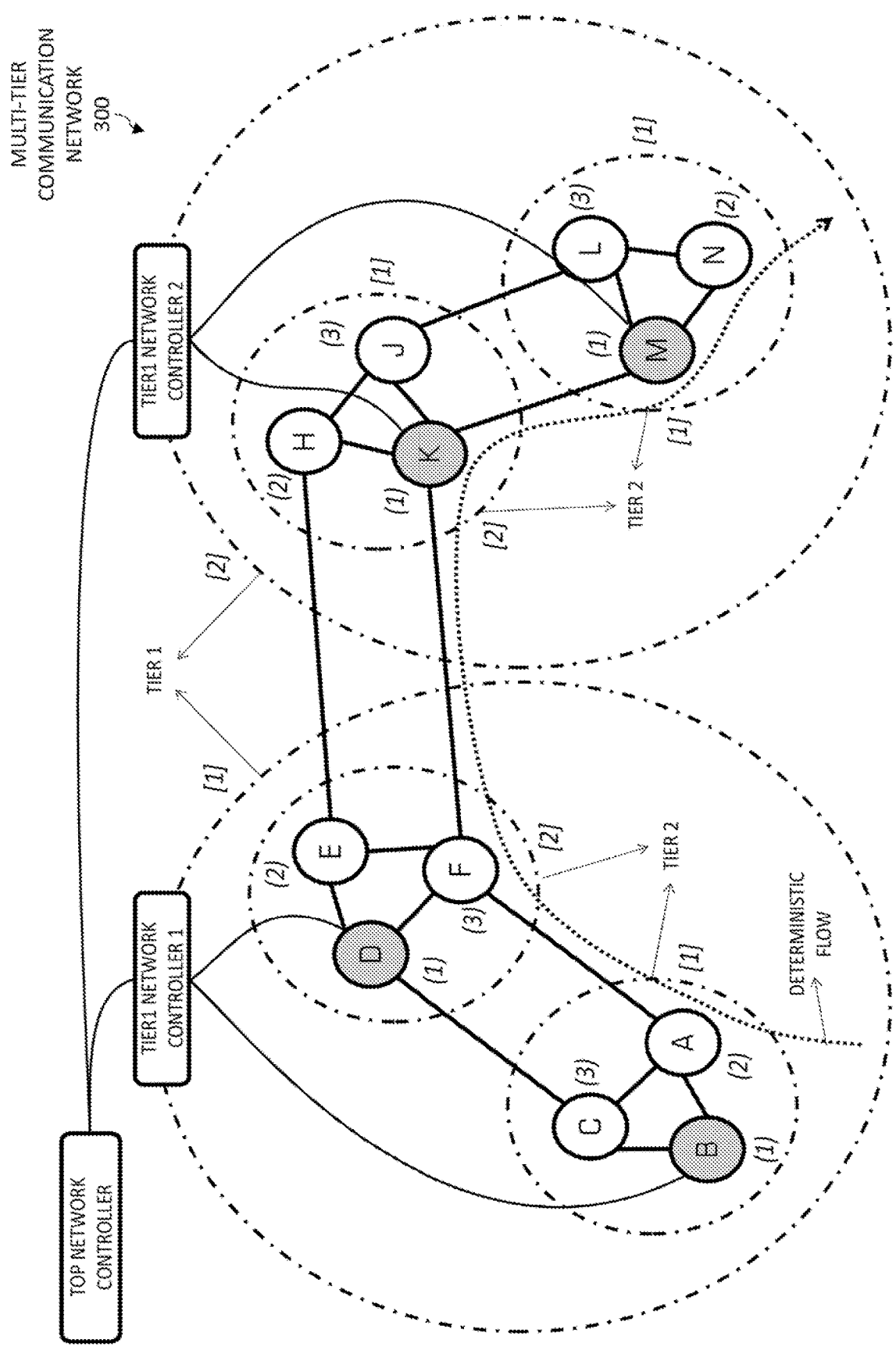
FIG. 3 depicts an example embodiment of multi-tier hierarchical network configured to support deterministic networking

It is noted that various aspects of such multi-tier hierarchical deterministic networks may be further understood by considering the examples of FIG. 2 and FIG. 3.

FIG. 2 depicts an example embodiment of multi-tier hierarchical network configured to support deterministic networking.

In FIG. 2, the multi-tier hierarchical network 200 includes a set of nodes 211 interconnected by a set of links 212. The nodes 211 are labeled as nodes A, B, C, D, E, F, H, J, K, L, M, and N for ease of reference. The nodes 211, as illustrated in FIG. 2, have been organized into clusters in two tiers (K=2) to form a multi-tier hierarchical deterministic network. The lower tier, denoted as Tier 2, includes four clusters as follows: (1) a first cluster including nodes A, B, and C with node B operating as the cluster leader, (2) a second cluster including nodes D, E, and F with node D operating as the cluster leader, (3) a third cluster including nodes H, J, and K with node K operating as the cluster leader, and (4) a fourth cluster including nodes L, M, and N with node M operating as the cluster leader. The upper tier, denoted as Tier 1, includes two clusters, each of which includes two of the Tier 2 clusters as sub-clusters as follows: (1) the first Tier 1 cluster includes the [A, B, C] and [D, E, F] clusters as sub-clusters and has a network controller (denoted as Tier 1 Network Controller 1) as its leader and (2) the second Tier 1 cluster includes the [H, J, K] and [L, M, N] clusters as sub-clusters and has a network controller (denoted as Tier 1 Network Controller 2) as its leader. The Tier 1 Network Controllers are controlled by a Top Network Controller, such that the Top Network Controller is capable of controlling any of the nodes 211 in the multi-tier hierarchical network 200. It will be appreciated that, although primarily presented with respect to a multi-tier hierarchical deterministic network having a specific number of hierarchical levels, the multi-tier hierarchical deterministic network may have any suitable number of hierarchical levels.

In FIG. 2, the multi-tier hierarchical network 200 supports deterministic networking. The deterministic networking may be based on one or more deterministic networking standards, such as IEEE TSN, IETF DetNet, or the like. The deterministic networking may be configured to provide deterministic services of bounded latency and zero congestion loss by configuring and allocating network resources for exclusive use of deterministic flows, providing or finding (in the data plane) the resources to be exploited by any given packet, and characterizing the behavior of those resources (e.g., transmission queue selection) so that latency and reliability bounds can be assured. The deterministic networking standards may include various types of standards, such as time synchronization standards (e.g., IEEE 802.1AS, IEEE 1588, or the like), high reliability (e.g., IEEE P802.1CB, IEEE 802.1Qca, IEEE 802.1Qci, P802.1AS-Rev, or the like), bounded latency (e.g., IEEE 802.1Qav, IEEE 802.1Qbu, IEEE 802.1Qbv, IEEE 802.1Qch, IEEE 802.1Qcr, or the like), data resources and APIs (e.g., IEEE 802.1Qat, IEEE 802.1Qcc, IEEE 802.1Qcp, IEEE 802.1CS, or the like), or the like, as well as various combinations thereof. In FIG. 2, an example of a deterministic flow 219, going through the path of A N, also is illustrated.

It will be appreciated that use of clustering to form the multi-tier hierarchical network 200 of FIG. 2 may be further understood by way of reference to FIG. 3.

It will be appreciated, that although primarily presented with respect to supporting deterministic networking in a particular type of communication network (e.g., a network having specific types, numbers, and arrangements of nodes organized in a multi-tier hierarchical manner), deterministic networking may be supported in various other types of communication networks (e.g., networks having other types, numbers, and/or arrangements of nodes, networks that are not hierarchical or that are hierarchical with other numbers of hierarchical levels, or the like, as well as various combinations thereof).

FIG. 3 depicts an example embodiment of multi-tier hierarchical network configured to support deterministic networking.

The multi-tier communication network 300 is similar to the multi-tier communication network 200 of FIG. 2 (illustratively, including the same arrangement of nodes, links, and controllers).

In the multi-tier communication network 300, assume that every node and cluster is associated with a "relative" identification number, which is unique only within the cluster (for nodes) and respective tier (for clusters) and is assigned manually or automatically by a distribution mechanism. An example of this distribution is illustrated in FIG. 3, where relative numbers of nodes and clusters are given in parentheses (.) and brackets [.], respectively.

In the multi-tier communication network 300, further assume that each node can also be identified with an "absolute" identification number, which is unique within the the multi-tier communication network 300 and is composed of a concatenation of its relative number and hierarchical combination of all relative identification numbers of associated clusters.

The relative identification number and absolute identification number may be further understood by considering an example associated with Node A in FIG. 3. In FIG. 3, for example, Node A has a relative identification number of (2), with its lowest tiered cluster numbered as [1] and its upper tier cluster numbered as [1], thereby forming an absolute identification number from highest tier to lowest tier entities that is represented in the vector of (1, 1, 2). In the case of cluster identification, for example, the local cluster to which Node A belongs at the lowest tier has a relative identification number of [1] and an absolute identification number vector of [1, 1]. This absolute identification number of that cluster is unique as it represents, from right to left, its own relative identification and the relative identification of its parent cluster [1].

With respect to identification numbers it is noted that, by default (e.g., unless gathered externally for communication needs), each node has only the knowledge of its identification numbers, neighbor nodes in its lowest tier cluster, and its leader node. Meanwhile, group/cluster leader nodes and SDN controllers can store and track relative and absolute identification numbers and links of entities within their respective tier and cluster (not necessarily all the entities lower in the hierarchy, if such entities exist) and can communicate with their designated controllers. Such a hierarchical relative/absolute identification number distribution is aimed to avoid or minimize communication and tracking complexity in large clustered networks, as well as enabling the proposed mechanism to function properly in the clustered networks. As for the example given in the figure, the following may be seen:

(1) The Top Network Controller has control over Tier 1 Network Controller 1 and Tier 1 Network Controller 2 at tier k=1, and is aware that these controllers are in charge of clusters [1] and [2], respectively. The Top Network Controller is also aware of inter-cluster links [1]E↔H[2] and [1]F↔K[2] with absolute identifiers of corresponding nodes E, H, F, and K. The link notation, for example [1]E↔H[2], means that the link between clusters [1] and [2] exists via nodes E and H. Multiple inter-cluster links could exist between two nodes; however, for ease of notation and without loss of generality, the example contains only a single link between two nodes.

(2) The Tier 1 Network Controller 1 has control over group leader nodes B and D at tier k=2, and is aware that these group leaders are in charge of clusters [1, 1] and [1, 2], respectively. The inter-cluster links [1, 1]C↔D[1,2] and [1,1]A↔F[1,2] are also tracked.

(3) The Tier 1 Network Controller 2 has control over group leader nodes K and M at tier k=2, and is aware that these group leaders are in charge of clusters [2, 2] and [2, 1], respectively. The inter-cluster links [2,2]K↔M[2,1] and [2,2]J↔L[2,1] are also tracked.

(4) The Tier 2 Group Leaders are in charge of their nodes in the clusters of the lowest tier. They have knowledge of links between the nodes in the cluster, with the purpose of finding any local path within the cluster, for a given path-finding mechanism. For example, group leader Node B has knowledge of intra-cluster links [1,1]A↔B[1,1], [1,1]B↔C[1,1] and [1,1]C↔A[1,1].

(5) The nodes have knowledge of their own relative and absolute identifiers, and know how to reach out to group leader.

It will be appreciated, that although primarily presented with respect to supporting deterministic networking in a particular type of multi-tier communication network (e.g., a multi-tier communication network having specific numbers and arrangements clusters and tiers), deterministic networking may be supported in various other types of multi-tier communication network (e.g., networks having other numbers and/or arrangements of clusters, networks having other numbers and/or arrangements of tiers, or the like, as well as various combinations thereof).

Figure 4:
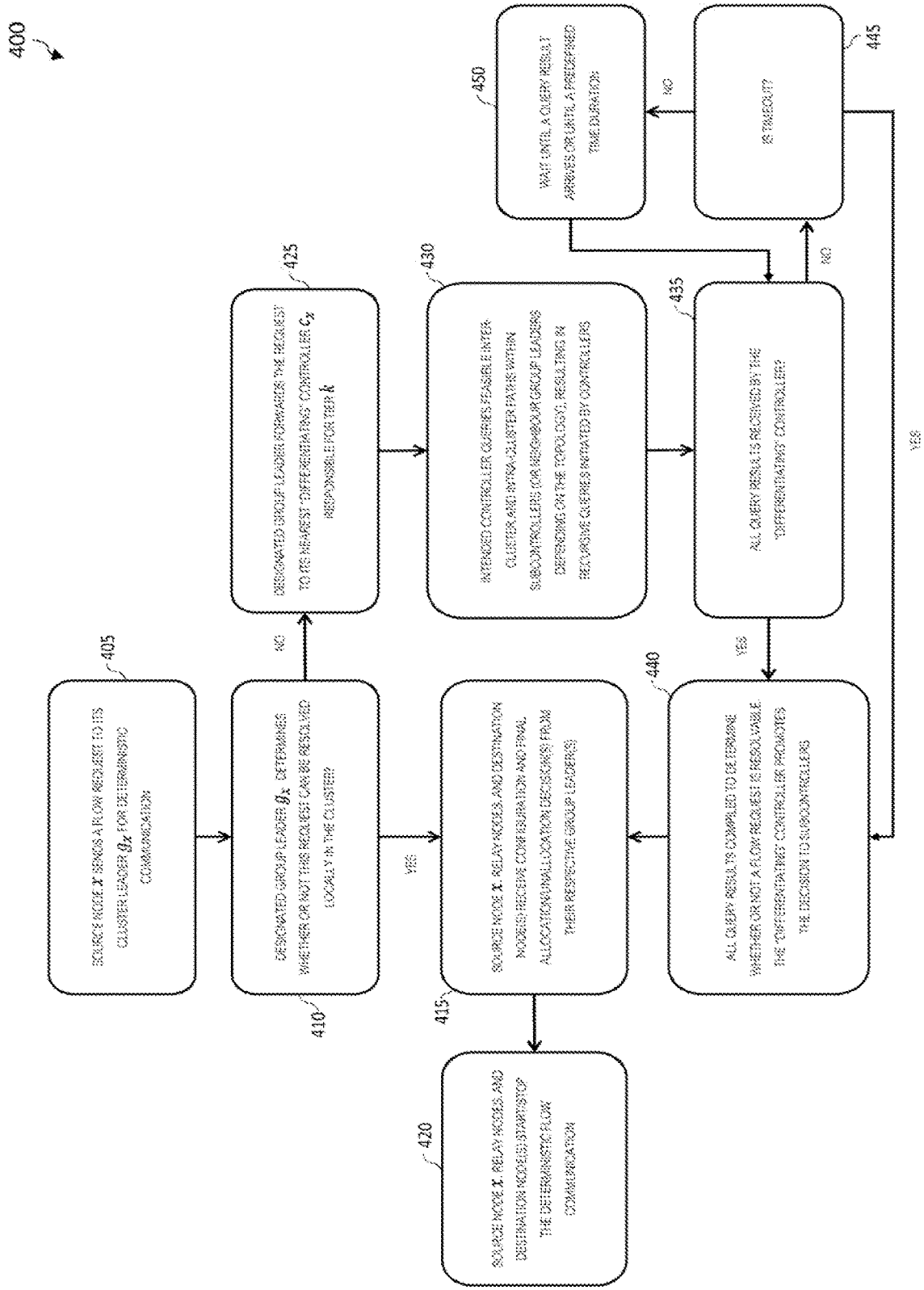
FIG. 4 depicts an example embodiment of a method for supporting provisioning of a deterministic flow in a multi-tier hierarchical network.

FIG. 4 depicts an example embodiment of a method for supporting provisioning of a deterministic flow in a multi-tier hierarchical network. For purposes of clarity, the method 400 is primarily described within the context of an example based on FIG. 3 in which node A wishes to communicate to node N using a deterministic flow.

At block 405, the source node x sends a flow request to its cluster leader $g_x$ for deterministic communication. For example, the source Node A sends its intention to its group leader, Node B, providing the absolute identification vector of destination Node N. From block 405, the method 400 proceeds to block 410.

At block 410, the designated group leader $g_x$ determines whether or not the flow request can be resolved locally in the cluster. The group leader node B, having both absolute identification vectors of nodes A and N, say (1,1,2) and (2,1,2) respectively, compares these vectors from right to left (from lowest tier to highest tier) and identifies that the first index in these vectors differs, i.e., (1,1,*2*)↔(2,1,*2*) where italicized numbers represent the found index i=2 (note that indices start with 0). The found index i is inversely proportional to the tier number in which related pointed cluster has enough global knowledge to resolve the request, i.e., the tier in charge of resolving the request is k=K−i and the related cluster is $C_k$. If the index is i=0 (which is not the case in this example) it would represent the fact the request can be resolved locally with the group leader and, thus, the method 400 would proceed to block 415. If the index i>0 (which is the case in this example), it would represent the fact the request cannot be resolved locally with the group leader and, thus, the method 400 would proceed to block 425.

At block 415, the source node x, the relay nodes, and the destination node(s) receive configuration and final allocation/unallocation decisions from their respective group leader(s). The nodes that are receiving the results of requests perform allocation or unallocation of resources (e.g., bandwidth, time slots, or the like) by triggering related deterministic protocol stacks (e.g., IEEE TSN, IETF DetNet, or the like) and respond with the results of the requested allocation or unallocation actions. From block 415, the method 400 proceeds to block 420.

At block 420, the source node x, the relay nodes, and the destination node(s) start/stop the deterministic flow communication. In the case of starting deterministic flow communication, the communication continues until further notice by the network controllers. In case of stopping deterministic flow communication, the related deterministic protocol stack in the node then is triggered to release the resources.

At block 425, the designated group leader forwards the request to its nearest "differentiating" controller $c_x$ responsible for tier k. In the example, since the identifier comparison from block 410 yielded i=2, therefore k=K−i=2−2=0 and, thus, the differentiating controller is the Top Network Controller and the designated group leader forwards the request to related controller. From block 425, the method 400 proceeds to block 430.

At block 430, the intended controller queries feasible inter-cluster paths and intra-cluster paths within sub-controllers (or neighbor group leaders depending on the topology), resulting in recursive queries initiated by controllers. In the example, provided that the top network controller received the request from respective group leader, having the source and destination vectors for Node A (1,1,2) and Node N (2,1,2), the following four operations would expected to take place in an asynchronous fashion:

Operation 1: For path A N between Node A (1,1,2) and Node N (2,1,2), the top tier controller checks existence of inter-cluster links (or sub-paths) connecting cluster [1] and [2] by executing a path finding mechanism, and among the feasible solutions, it picks one solution following a criteria (e.g., minimum hops, minimum cost with cost being a function of delay and throughput, or the like). Assume that the inter-cluster link [1]F↔K[2] is selected in the example. Given that more paths need to be resolved between nodes A↔ . . . ↔F and nodes K↔ . . . ↔N as result of vector comparison similar to earlier stages, the top controller launches a path resolution request, this time requesting A↔ . . . ↔F from Tier 1 Network Controller 1 and requesting K↔ . . . ↔N from Tier 1 Network Controller 2.

Operation 2: Tier 1 Network Controller 1 checks out A↔ . . . ↔F between nodes A and F, resolves inter-cluster paths at its tier, and picks a solution (say [1, 1] A↔F [1, 2]). As absolute identifiers of both node A (1, 1, 2) and node F (1, 2, 3) for the link are known and the index i=1 is pointing out to this controller, there is no more need of recursive requests that could be potentially forwarded to group leaders in the bottom tiers. The result is forwarded to the top controller.

Operation 3: Tier 1 Network Controller 2 checks out K↔ . . . ↔N between nodes K an N, resolves inter-cluster paths at its tier, and picks a solution (say [2, 2] K↔M [2, 1]). Similar to Operation 2 above, there is no need of additional requests for resolving K↔M, however, for M↔ . . . ↔N, group leader M receives a request from the controller to resolve the path M↔ . . . ↔N. When all results are resolved, they are forwarded to the top controller.

Operation 4: The group leader M, having both absolute identifiers of node M and node N, performs a comparison and figures out that the solution can be found locally. It triggers a path computation mechanism and, among feasible solutions, it picks [2,1]M↔N [2, 1]. The result is forwarded back to requesting controller.

It is noted that, from block 430, the method 400 proceeds to block 435 for determining whether all of the associated responses have been received based on the recursive queries.

At block 435, a determination is made as to whether all query results have been received by the "differentiating" controller. The controller determines whether all recursive requests from its lower tier controllers are returned or not. If all query results have been received by the differentiating controller, then the method 400 proceeds to block 440, otherwise the method 400 proceeds to block 445.

At block 440, all query results are compiled to determine whether or not the flow request is resolvable. The "differentiating" controller promotes the decision to sub-controllers. As an example, feasible link/sub-path solutions from Operation 4 (namely, M↔N), Operation 3 (namely K↔M), Operation 2 (namely K↔M and A↔F), and Operation 1 (namely F↔K) are compiled. The final path, which is A↔F↔K↔M↔N, is feasible and, thus, is promoted to sub-controllers of the path. It is noted that, if there is no feasible solution, this also would be promoted. From block 440, the method 400 proceeds to block 415.

At block 445, a determination is made as to whether a timeout has occurred. The determination may be made based on a predefined timeout threshold. If a timeout has occurred, the method 400 returns to block 440, otherwise the method 400 proceeds to block 450.

At block 450, the controller waits until the query results arrive or a predefined time duration. From block 450, the method 400 returns to block 435, where a determination is again made as to whether all query results have been received by the "differentiating" controller. The method 400 continues in this manner until all query results have been received by the "differentiating" controller (block 435) or until a timeout is detected (block 445), at which time all query results are compiled to determine whether or not the flow request is resolvable (block 440).

Figure 5:
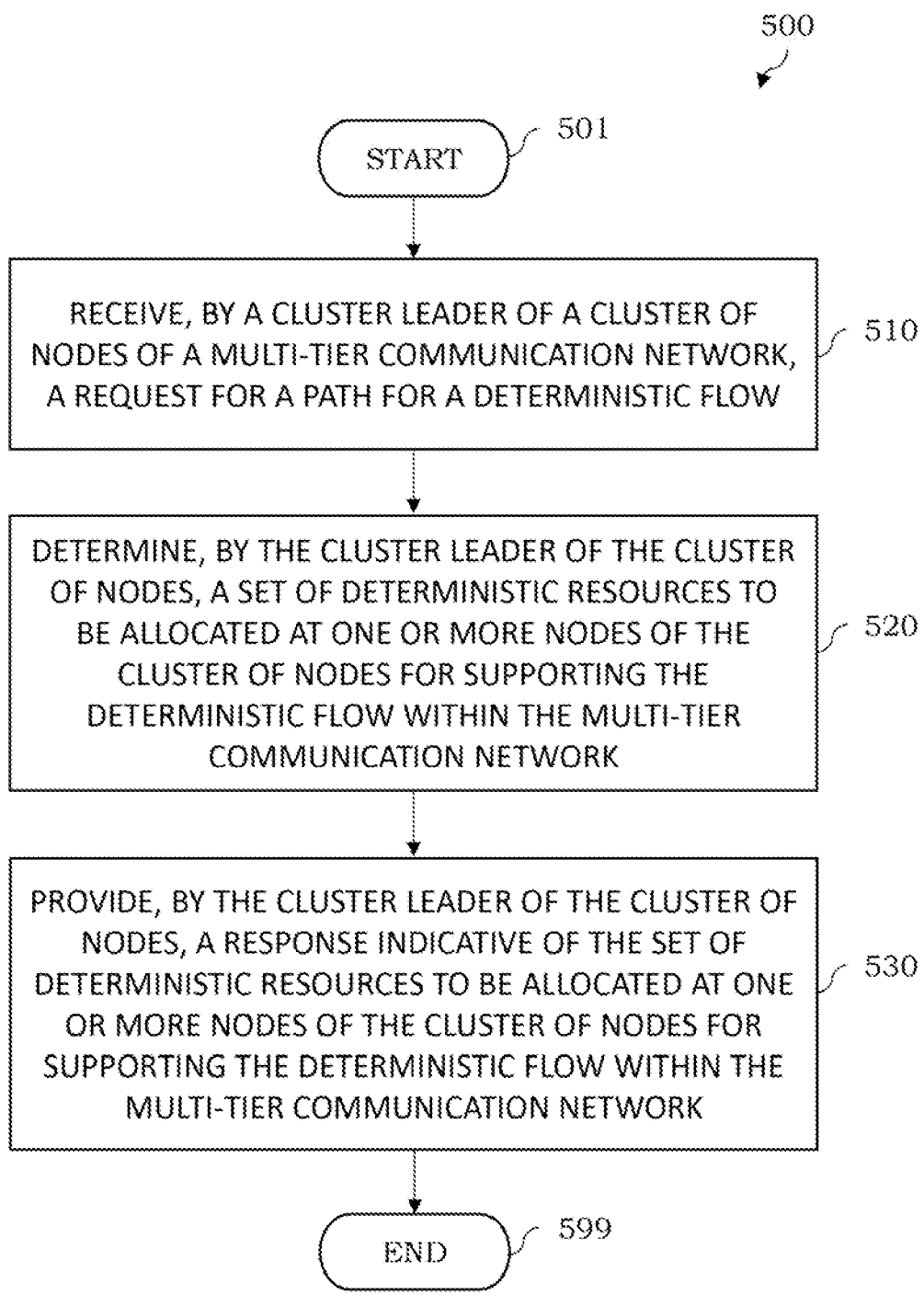
FIG. 5 depicts an example embodiment of a method for supporting provisioning of a deterministic flow in a multi-tier hierarchical network.

FIG. 5 depicts an example embodiment of a method for supporting provisioning of a deterministic flow in a multi-tier hierarchical network. It will be appreciated that although primarily presented as being performed serially, at least a portion of the blocks of method 500 may be performed contemporaneously or in a different order than as presented in FIG. 5.

It will be appreciated that the manner in which the blocks of method 500 are performed may depend on which element of the multi-tier hierarchical network is performing the functions (e.g., a node that is operating as a cluster leader in the lowest tier, a node or controller operating as a cluster leader and at a tier above the lowest tier, or the like as well as various combinations thereof).

It will be appreciated that various functions of method 400 of FIG. 4 may be performed within the context of the method 500 of FIG. 5 depending on which element of the multi-tier hierarchical network is performing the functions (e.g., a node that is operating as a cluster leader in the lowest tier, a node or controller operating as a cluster leader and at a tier above the lowest tier, or the like as well as various combinations thereof).

At block 501, the method 500 begins.

At block 510, receive, by a cluster leader of a cluster of nodes of a multi-tier communication network, a request for a path for a deterministic flow.

The cluster of nodes may be at any tier of the multi-tier communication network. For example, the cluster of nodes may be at the lowest tier, in which case the request may be received by a node of the cluster that is operating as a cluster leader for the cluster and may be received from a source of the deterministic flow or another node of the cluster on behalf of the source of the deterministic flow. For example, the cluster of nodes may be at a next-to-lowest tier, in which case the request may be received by node of a cluster of the next-to-lowest tier that is operating as a cluster leader for the cluster of the next-to-lowest tier or from a controller that is operating as a cluster leader for the cluster of the next-to-lowest tier (e.g., a Tier 1 Network Controller or other controller), may be received from a cluster leader of a cluster of the lowest tier, may be received based on a determination by the cluster leader of the cluster of the lowest tier that the request for the path for the deterministic flow cannot be resolved within the cluster of the lowest tier, and so forth.

The request for the path for the deterministic flow may be a request for the end-to-end path for the deterministic flow (e.g., when received by the cluster leader of the cluster of nodes from the source of the deterministic flow), a request for a sub-path forming a portion of the end-to-end path (e.g., an intra-cluster sub-path, an inter-cluster sub-path, or the like, as well as various combinations thereof) for the deterministic flow (e.g., when received by a cluster leader of a cluster at a tier above the lowest tier such that the end-to-end path may span multiple clusters at one or more hierarchical layers of the multi-tier communication network), or the like.

At block 520, determine, by the cluster leader of the cluster of nodes, a set of deterministic resources to be allocated at one or more nodes of the cluster of nodes for supporting the deterministic flow within the multi-tier communication network.

The set of deterministic resources to be allocated at one or more nodes of the cluster of nodes for supporting the deterministic flow within the multi-tier communication network may be determined by the cluster leader of the cluster of nodes locally. This may be the case where the cluster leader determines that the end-to-end path or relevant portion of the end-to-end can be resolved locally within the cluster without a need for recursive propagation of requests to a cluster leader at a next-higher tier of the multitier communication network.

The set of deterministic resources to be allocated at one or more nodes of the cluster of nodes for supporting the deterministic flow within the multi-tier communication network may be determined by the cluster leader of the cluster of nodes based on propagation of a request to a cluster leader at a next-higher tier of the multitier communication network and receipt of an associated response from the cluster leader at the next-higher tier of the multitier communication network. It will be appreciated that the response from the cluster leader at the next-higher tier of the multitier communication network may be based on recursive requests and responses by and to, respectively, cluster leaders at even higher tiers of the multi-tier communication network until reaching a tier with visibility to the end-to-end path for the deterministic flow.

The set of deterministic resources may include various types of deterministic resources which may be allocated at nodes for supporting a deterministic flow (e.g., bandwidth, time slots, or the like, as well as various combinations thereof).

At block 530, provide, by the cluster leader of the cluster of nodes, a response indicative of the set of deterministic resources to be allocated at one or more nodes of the cluster of nodes for supporting the deterministic flow within the multi-tier communication network. The response may be provided to one or more nodes of the end-to-end path for the deterministic flow (e.g., where the cluster leader of the cluster of nodes is associated with the cluster at the lowest tier of the multi-tier communication network), one or more cluster leaders of one or more clusters at a next-lower tier of multi-tier communication network (e.g., where the cluster leader is a node or controller operating at a tier above the lowest tier of the multi-tier communication network) which may then in turn send associated responses to one or more cluster leaders of one or more clusters at the lowest tier of the multitier communication network, and so forth. In this manner, responses may be recursively delivered from cluster leaders higher in the multi-tier communication network to cluster leaders lower in the multi-tier communication network until each of the nodes of the end-to-end path of the deterministic flow (namely, the source node, one or more relay nodes, and one or more destination nodes) is informed of the deterministic resources to be allocated for the deterministic flow. The nodes of the end-to-and path of the deterministic flow may allocate deterministic resources for the deterministic flow by triggering the deterministic protocol stacks in the nodes to allocate the deterministic resources for the deterministic flow.

At block 599, the method 500 ends.

Various example embodiments for supporting multi-tier deterministic networking may provide various advantages or potential advantages. For example, various example embodiments for supporting multi-tier deterministic networking may be configured to support handling of resources in a manner configured to support procedures and interfacing in deterministic communications such as IEEE TSN and IETF DetNet. For example, various example embodiments for supporting multi-tier deterministic networking may be configured to construct a hierarchical federated mechanism, instead of fully centralized or decentralized approaches, making it possible to scale the solution without dramatic loss in network performance. For example, various example embodiments for supporting multi-tier deterministic networking may be configured to enable hierarchical clustered topologies to be mapped as hierarchical latency zones of the network, thereby providing support for deterministic communications in edge and central clouds. For example, various example embodiments for supporting multi-tier deterministic networking may be configured to enable partial (and dynamic) construction of a path/sub-path of a deterministic flow, as well as source routing methods and federation for the final path, that can provide a substantial advantage over traditional methods in terms of configuration and scalability. For example, various example embodiments for supporting multi-tier deterministic networking may be configured to support flow allocation (and routing) in networks, including large-scale networks, for deterministic communications. For example, various example embodiments for supporting multi-tier deterministic networking, by supporting balance between centralized and decentralized network operation, may be configured to overcome various deficiencies associated with centralized network operation (e.g., where a large number of nodes in the network, if not handled properly, may cause scalability issues and performance degradation, due to centralized high-complexity allocation mechanisms) and various deficiencies associated with decentralized network operation (e.g., where lack of a global view of network or need of additional communications for state exchange may result in poorer performance, if not designed carefully). For example, various example embodiments for supporting multi-tier deterministic networking, by supporting balance between centralized and decentralized network operation, may be configured to handle any additional complexity that may be introduced by physical and/or virtual topology changes introduced due to mobility in different time scales and for various reasons. For example, various example embodiments for supporting multi-tier deterministic networking may be configured to support deterministic networking while overcoming various challenges which may be faced in large networks (e.g., handling global or partial network state changes, gathering context information, prediction of metrics, or the like). For example, various example embodiments for supporting multi-tier deterministic networking may be configured to support deterministic networking while overcoming various potential issues related to overhead in computation and communication due to scheduling and/or allocation mechanisms that might otherwise overuse various types of resources. For example, various example embodiments for supporting multi-tier deterministic networking may be configured to enable products empowered by time-sensitive networking protocol stacks (e.g., IEEE TSN and IETF DetNet protocol stacks), which typically focus on small local areas for deterministic network communications, to bring deterministic networking to larger areas. For example, various example embodiments for supporting multi-tier deterministic networking may be configured to support one or more of representation of a hierarchical clustered network topology compatible with latency-based zoning in deterministic networking, hierarchical allocation/deallocation of deterministic resources in time-sensitive networks, identification and coordination of network entities for end-to-end deterministic flow communications, construction of end-to-end deterministic paths for deterministic flows in a federated manner, deterministic networking in larger geographical areas, or the like, as well as various combinations thereof. For example, various example embodiments for supporting multi-tier deterministic networking may be configured to provide the above-described advantages or potential advantages and/or overcome the above-described challenges as well as various other challenges, while still supporting bounded deterministic performance constraints for various types of deterministic measures (e.g., latency, jitter, reliability, or the like). Various example embodiments for supporting multi-tier deterministic networking may provide various other advantages or potential advantages.

It will be appreciated that various example embodiments for supporting multi-tier deterministic networking may be configured to support various other functions for supporting multi-tier deterministic networking.

Various example embodiments for supporting multi-tier deterministic networking may be configured to supporting flow reliability in multi-tier deterministic networking. Various example embodiments for supporting flow reliability in multi-tier deterministic networking may be configured to support flow reliability in multi-tier deterministic networking based on use of frame replication and elimination for deterministic flows. Various example embodiments for supporting flow reliability in multi-tier deterministic networking may be configured to support flow reliability in multi-tier deterministic networking based on control over frame replication and elimination for deterministic flows.

Figure 6:
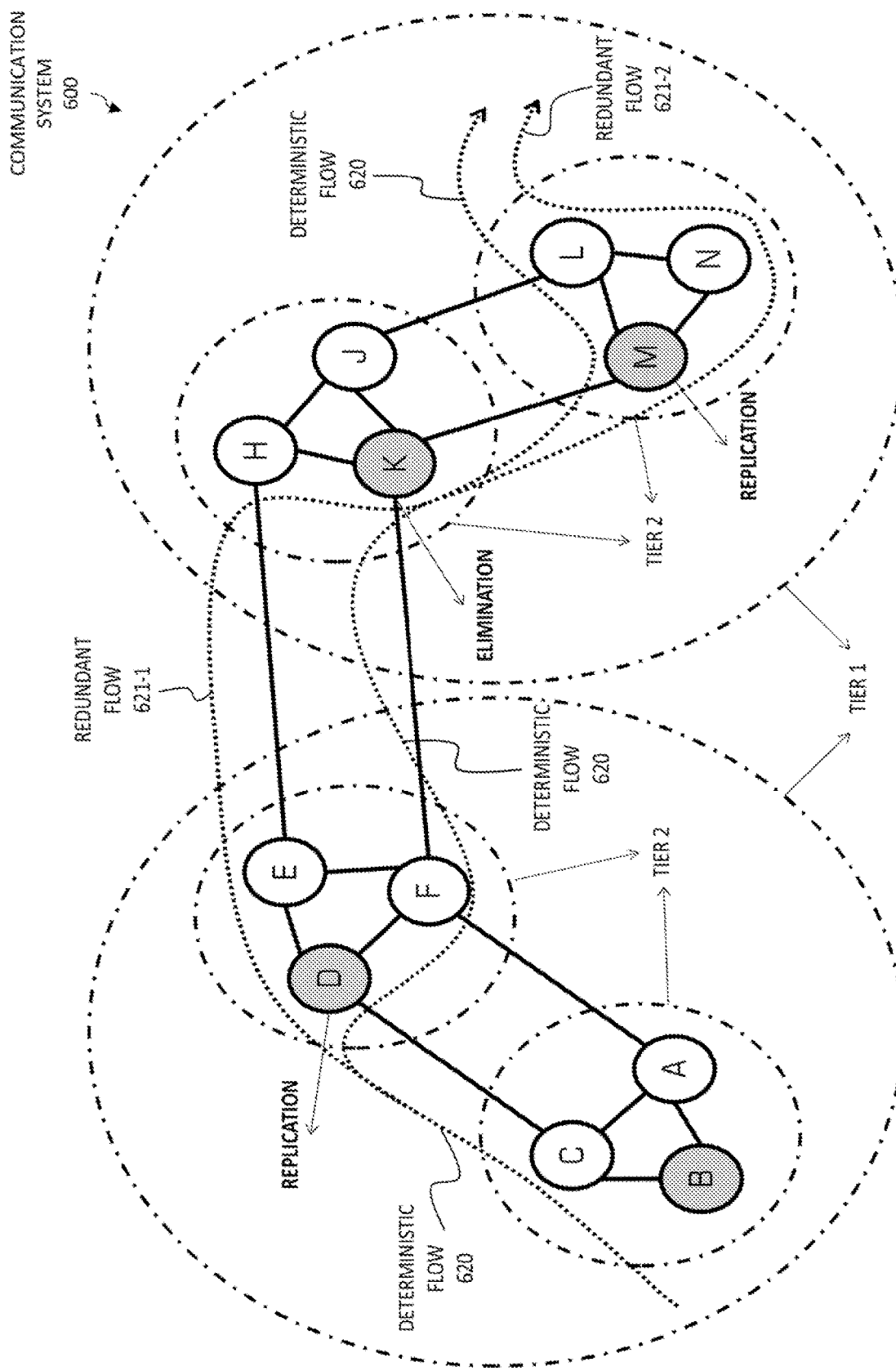
FIG. 6 depicts an example embodiment of a communication system configured to support deterministic networking reliability based on flow replication and elimination.

FIG. 6 depicts an example embodiment of a communication system configured to support deterministic networking reliability based on flow replication and elimination.

In FIG. 6, the communication system 600 supports reliability for deterministic networking. The reliability for deterministic networking may be based on use of redundant flows to protect deterministic flows. The reliability for a deterministic flow based on use of a redundant flow to protect at least a portion of the deterministic flow may be based on use of deterministic flow replication/elimination capabilities along the path of the deterministic flow. The reliability for a deterministic flow based on use of deterministic flow replication/elimination capabilities along the path of the deterministic flow may be based on use of a replication function configured to replicate the deterministic flow to provide the redundant flow for the deterministic flow and an elimination function configured to eliminate the redundant flow for the deterministic flow. It will be appreciated that one or more such pairs of replication and elimination functions may be used along a deterministic flow to provide reliability for one or more portions of the deterministic flow. It will be appreciated that, by replicating flows, sending flows on separate paths, and then using sequence numbers to eliminate replicas, the effective probability of packet loss is reduced or minimized and reliability of the deterministic flows is increased or maximized.

In FIG. 6, the communication system 600 includes a similar arrangement of nodes as in the communication system 100 of FIG. 1, including the clustering of the nodes as well as the hierarchical arrangement of the nodes. The communication system 600 includes a deterministic flow 620 along the path C↔D↔F↔K↔M↔L. The communication system 600 includes two redundant flows 621-1 and 621-2 (collectively, redundant flows 621) configured to protect portions of the deterministic flow 620. Namely, the redundant flow 621-1 follows the path D E↔H↔K that protects the portion of the deterministic flow 620 between nodes D and K (based on a replication function performed at node D and an elimination function performed at node K) and the redundant flow 621-2 follows the path M↔N↔L that protects the portion of the deterministic flow 620 between nodes M and L (based on a replication function performed at node M and an elimination function which is located downstream and which, for purposes of clarity, is omitted from FIG. 6).

It will be appreciated that various example embodiments for supporting flow reliability in multi-tier deterministic networking may be configured to support various other functions for supporting flow reliability in multi-tier deterministic networking.

Various example embodiments for supporting multi-tier deterministic networking may be configured to support adaptive deterministic routing in multi-tier deterministic networks.

Various example embodiments for supporting adaptive deterministic routing in multi-tier deterministic networks may be configured to support an agent-based adaptive flow routing mechanism. Various example embodiments for supporting adaptive deterministic routing in multi-tier deterministic networks may be configured to support an agent-based adaptive flow routing mechanism where deterministic communications may be based on IEEE TSN, IETF DetNet, or the like. For example, various example embodiments of the agent-based adaptive flow routing mechanism may be used for IETF DetNet network architectures or, more generally, in multi-tier networks with a relatively large number of clusters. For example, various example embodiments of the agent-based adaptive flow routing mechanism may be configured to use signaling and control mechanisms of the IEEE TSN protocol stack to seamlessly allocate and deallocate resources for deterministic flows. In this manner, the IETF DetNet and IEEE TSN protocol stacks may allow the routing protocol to achieve the goal of deterministic networking for various deterministic performance measured, in various environments in which deterministic networking may be applied, or the like, as well as various combinations thereof. For example, various example embodiments of the agent-based adaptive flow routing mechanism may be configured to support agent-based hierarchical flow allocation and routing capabilities for deterministic clustered networks. For example, various example embodiments of the agent-based adaptive flow routing mechanism may be configured to enable nodes to dynamically find end-to-end paths that can meet deterministic performance targets such as bounded latency and jitter. For example, various example embodiments of the agent-based adaptive flow routing mechanism may be configured to leverage a clustered multi-tier IP network, empowered by IEEE TSN and/or IETF DetNet protocol stacks, while exploiting deep reinforcement (machine) learning techniques which can dynamically approximate the state/search space of path finding. For example, various example embodiments of the agent-based adaptive flow routing mechanism may be configured to enable nodes to find and propose paths between two endpoints, and to dynamically adapts the search depending on network conditions and deterministic targets, irrespective of whether the target network is a clustered multi-tiered network or a non-hierarchical network. For example, various example embodiments of the agent-based adaptive flow routing mechanism may be configured to support a balance between the shortest path and the least congested path while also taking into account hierarchical clustered aspects of the network in a distributed manner as well as deterministic traffic which may be transported within such a network. For example, various example embodiments of the agent-based adaptive flow routing mechanism may be configured to support various other functions for supporting adaptive deterministic routing.

Various example embodiments for supporting adaptive deterministic routing in multi-tier deterministic networks may be further understood by considering the networks of FIG. 1, FIG. 2, FIG. 3, and/or FIG. 6. It will be appreciated that the multi-tier deterministic network in which adaptive deterministic routing is applied may be formed in various ways, e.g., statically (e.g., using approaches defined by the network operator), dynamically using algorithmic approaches (e.g., with predefined intents, constraints, and performance conditions), dynamically as presented herein with respect to FIG. 2 and FIG. 3, or the like, as well as various combinations thereof.

Figure 7:
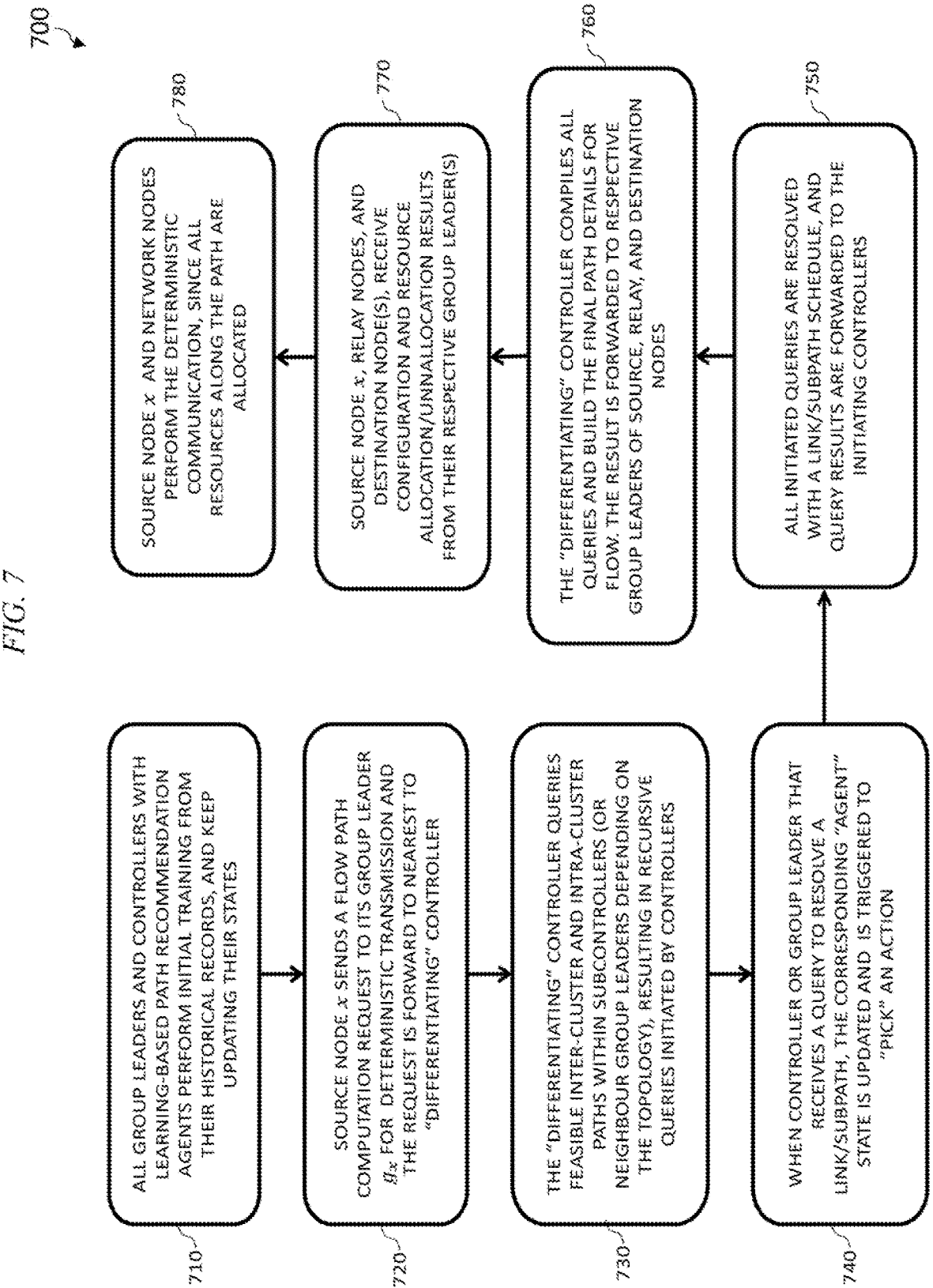
FIG. 7 depicts an example embodiment of a method for supporting provisioning of a deterministic flow in a multi-tier hierarchical network.

FIG. 7 depicts an example embodiment of a method for supporting provisioning of a deterministic flow in a multi-tier hierarchical network. For purposes of clarity, the method 700 is primarily described within the context of an example based on FIG. 3 in which node A wishes to communicate to node N using a deterministic flow or based on FIG. 6 in which node C wishes to communicate to node L using a deterministic flow.

At block 710, the group leaders and controllers with deep reinforcement learning-based path recommendation agents perform initial training from their historical records, and keep updating their states. The group leader nodes and controllers, each of them having a learning agent, can be trained and queried for a potential action that translates into a feasible link/sub-path which may be used later to compile a final path. The training procedure remains ongoing in an asynchronous fashion. A path recommendation agent and environment may have the properties and behavior as presented in FIG. 8.

At block 720, a source node x sends a flow path computation request to its group leader $g_x$ for deterministic transmission. This request is forwarded to the nearest "differentiating" controller. The differentiating controller is a controller that has global knowledge of all group leaders under its administration, potentially somewhere up in the hierarchy, not always necessarily the top controller.

At block 730, the differentiating controller queries feasible inter-cluster and intra-cluster paths within sub-controllers (or neighbor group leaders depending on the topology), resulting in recursive queries initiated by controllers. Each sub-controller or neighbor group leader (acting as an environment) receiving a respective query interacts with its agent to find and schedule resources for a link/sub-path under its administration.

At block 740, when a controller or group leader that receives a query to resolve a link/sub-path, the corresponding "path agent" state is updated and is triggered to "pick" an action.

At block 750, all initiated queries are resolved with a link/sub-path schedule, and query results are forwarded to the initiating controllers.

At block 760, the differentiating controller compiles all queries and builds the final path details for the deterministic flow. The result is forwarded to respective group leaders of the source and destination nodes.

At block 770, the source node x, relay nodes, and destination nodes receive configuration and resource allocation/unallocation results from their respective group leader(s). In case of failure of allocating the resources in any node, the differentiating controller is expected to be informed by the related node(s), in which case it relays this information to all relevant entities of the path.

At block 780, the source node x and the network nodes perform the deterministic communication, since all resources along the path are allocated.

Figure 8:
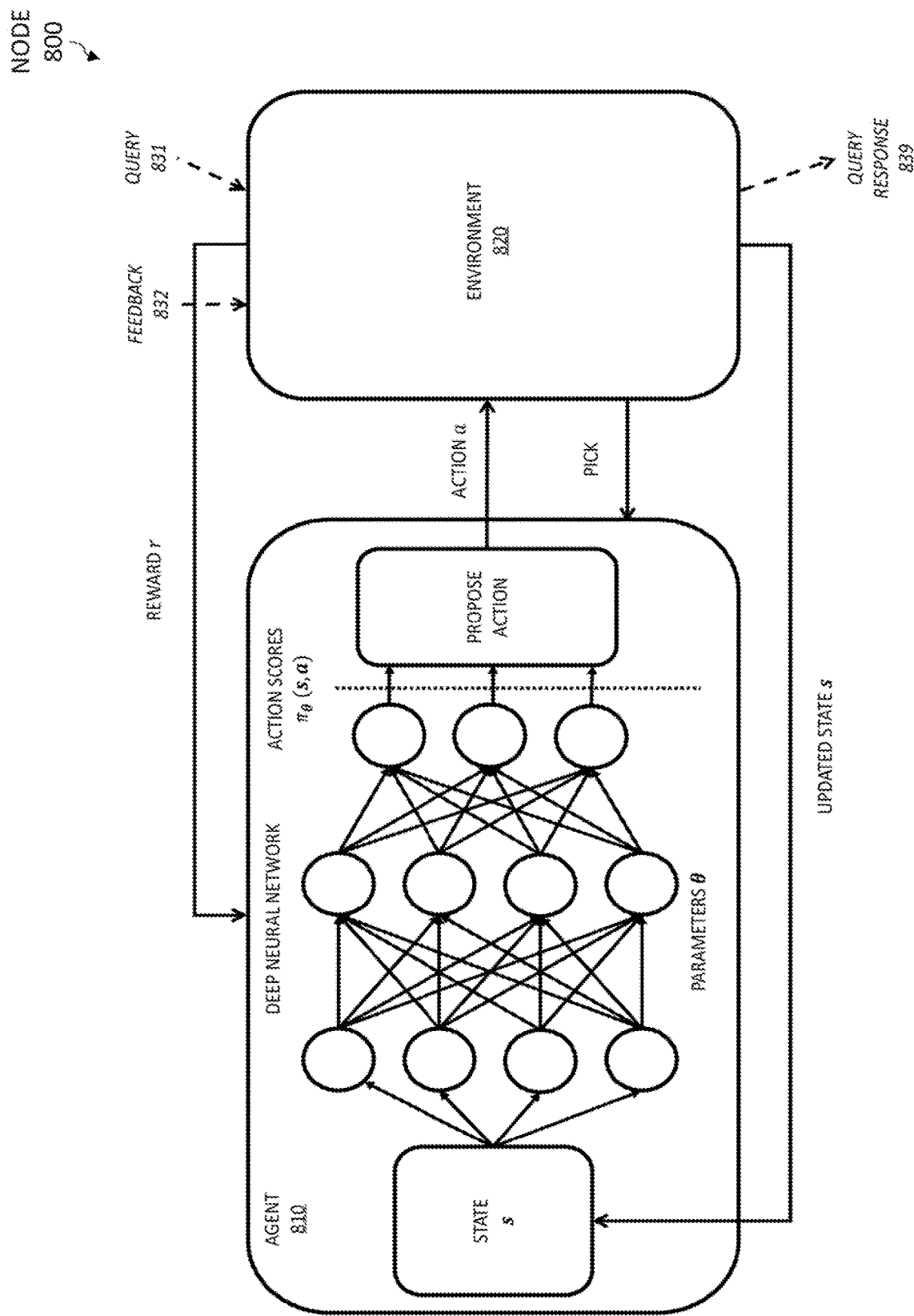
FIG. 8 depicts an example embodiment of a node including a path recommendation agent configured to determine a path for a deterministic flow.

FIG. 8 depicts an example embodiment of a node including a path recommendation agent configured to determine a path for a deterministic flow. It will be appreciated that the path recommendation agent in the node 800 of FIG. 8 may be suitable for use in performing various blocks of the method 700 of FIG. 7 (e.g., block 710).

In FIG. 8, the agent 810 is an adaptive flow agent configured to support learning and link/sub-path recommendations.

In FIG. 8, the environment 820 represents an abstraction of a group leader node or controller (e.g., internal state and mechanics of a group leader node or controller), which interacts with its agent when a link/sub-path recommendation is needed.

In FIG. 8, a query message 831 might arrive from controllers or other group leaders to resolve a flow routing request between two nodes, and depending on the configuration and administrative restrictions, the environment 820 then (1) updates its internal state (discussed in detail further below) that is shared with the agent 810 via an update state signal s, (2) triggers a pick signal p to compute feasible link/sub-path recommendations by the agent 810, (3) choses one of the link/sub-path candidates (namely proposed actions/recommendations) according to its heuristic preferences, and (4) informs the requesting group leader or controller about link/sub-path choice via a query response message 839.

In FIG. 8, after the usage of the related link/sub-path is completed for a given flow, the environment 820 then expects to receive a delayed feedback message 832 from involved controllers such that it can calculate a reward function. The result of reward function, namely reward r, is shared with the agent 810 via internal signaling. In addition to this, the environment 820 might also receive other types of feedback messages (e.g., inter/intra-cluster link load status and other key performance indicators) with the ultimate aim of having a better state representation of the network for routing decisions.

In FIG. 8, given an observed state matrix as input and a set of internal parameters θ quantifying weights between internal elements, the agent 810 is essentially a deep neural network that can propose actions a, whenever requested via the pick signal p. The output of the deep neural network is action scores $\pi(s, a)$ and is a vector that represents a list of normalized preferences for potential actions from which the environment 820 can chose. Each of these actions, depending on the design of input and neural network nodes, can represent a candidate link/sub-path while considering the combinatorial nature of feasible possibilities.

In FIG. 8, the environment 820 keeps a state representation for deterministic flow scheduling that is shared with the agent 810. The state representation for deterministic flow scheduling may be a two (or more) dimensional state matrix which may be padded with zeroes as needed. An example of such a state matrix providing a state representation for deterministic flow scheduling is presented in FIG. 9.

Figure 9:
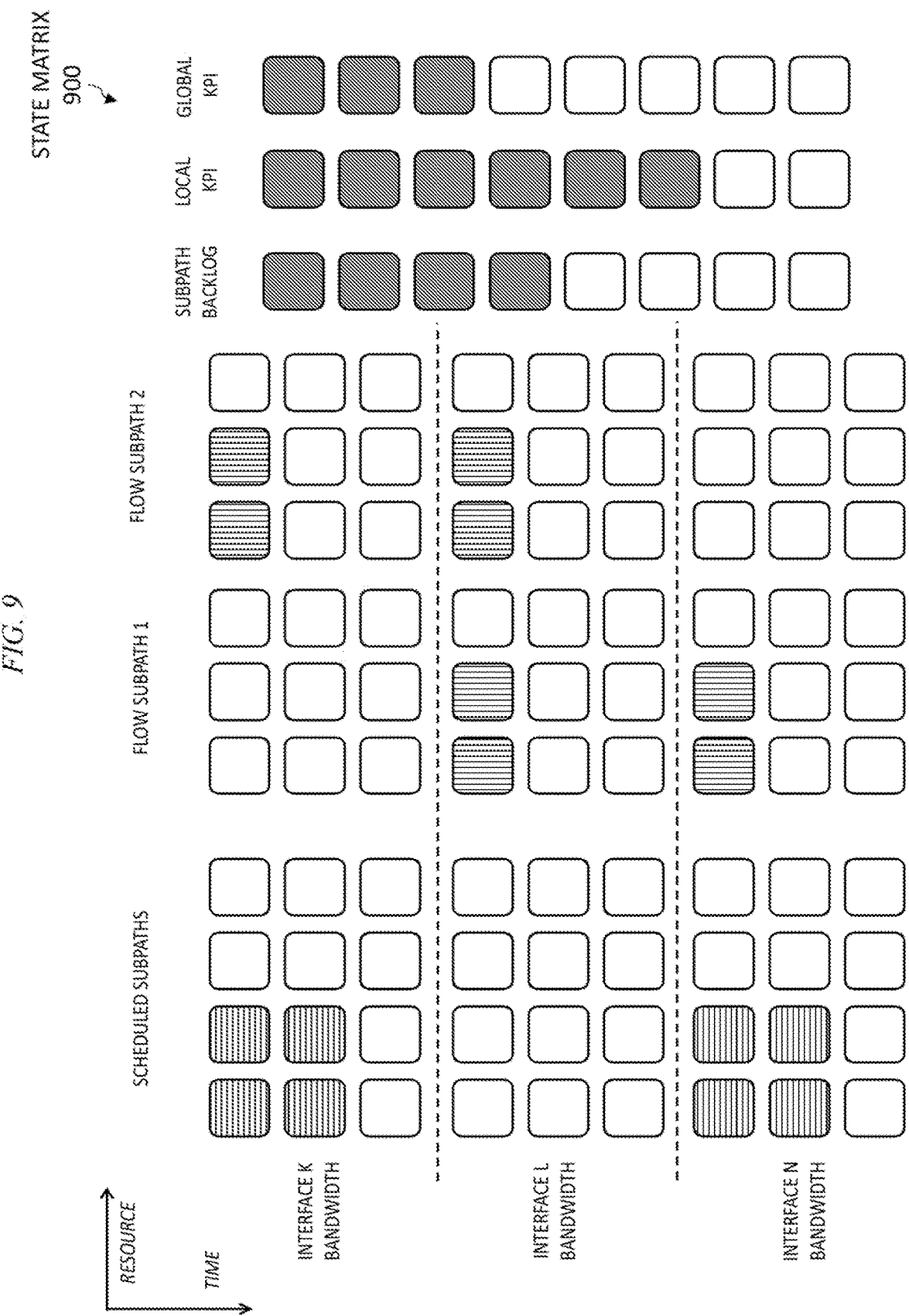
FIG. 9 depicts an example embodiment of a state matrix providing a state representation for deterministic flow scheduling.

In FIG. 9, the state matrix 900 maintained by a node for supporting deterministic flow scheduling includes three blocks that represent the scheduled sub-paths, candidate deterministic flow sub-paths that are waiting to be scheduled, and support metrics, respectively.

In FIG. 9, the scheduled sub-paths are represented in the first block of the matrix. This scheduled sub-paths block in the matrix represents the information about scheduled deterministic sub-paths that is distributed across multiple interfaces of the environment (which might include multiple interfaces with various bandwidth requirements, latency requirements, or other type of requirements). The rows represent the amount of resource usage over time slots, and the columns represent the amount of resources in a given location. For example, a scheduled flow in with horizontal cross-hatching is consuming two units of bandwidth both at interface K and interface N at time slot 1, and again will be consuming two units of bandwidth at the next time slot (time slot 2). It will be appreciated that, although primarily presented with respect to use of bandwidth requirements in the state representation, various other types of requirements may be specified within the state representation (e.g., blocks for delay requirements, blocks for other resource requirements, or the like, as well as various combinations thereof for supporting deterministic and time-sensitive transmissions.

In FIG. 9, candidate deterministic flow links/sub-paths that arrive to the scheduling system (waiting to be scheduled) are represented in the middle block of the matrix. For example, Flow sub path 1 requires two units of bandwidth resources at interface L at time slot 1, and also requires two units of bandwidth resources at interface N at time slot 1. It is noted that, since the number of candidate link/sub-path scheduling requests that arrive to system can be large, the matrix may be restricted to represent only first predefined number of arrivals as an approximation and the rest may be quantified in a sub-path backlog block maintained as part of the last block of the matrix. It is noted that, although only two arrived feasible sub-path choices for the same flow (represented with the vertical hatching) are depicted for purposes of clarity, there might be multiple feasible solutions of multiple flows which may be represented within the matrix.

In FIG. 9, certain support metrics are represented in the last block of the matrix. These metrics may include various metrics which may facilitate a more efficient scheduling of deterministic flows. One such metric, as indicated above, may be the sub-path backlog block. Other metrics, as illustrated in FIG. H, may include local and global key performance indicator (KPI) metrics, which could be related to link states, a reward function, or the like. It will be appreciated that the last block of the matrix may include various other metrics configured to facilitate a more efficient scheduling of deterministic flows.

In FIG. 8, the agent 810, whenever requested by the environment 820 via a pick signal p, considers its input and weights, and proposes a vector of action scores/preferences.

Here, each action score a at the output represents a numerical score/value for given feasible links/sub-paths that are waiting in the environment 820. Given these preferences, the environment 820 effectively decides to act on the highest scored action, meaning it puts the selected solution into its scheduled queue and updates its state. The scheduled interfaces for such a route, as described herein, is disseminated to the related controllers via the query response 839.

It will be appreciated that as the system keeps operating in this manner then, ultimately, every controller and group leader (each of them having their own agent) contributes to a hierarchical recursive system of path finding in the clustered network.

Figure 10:
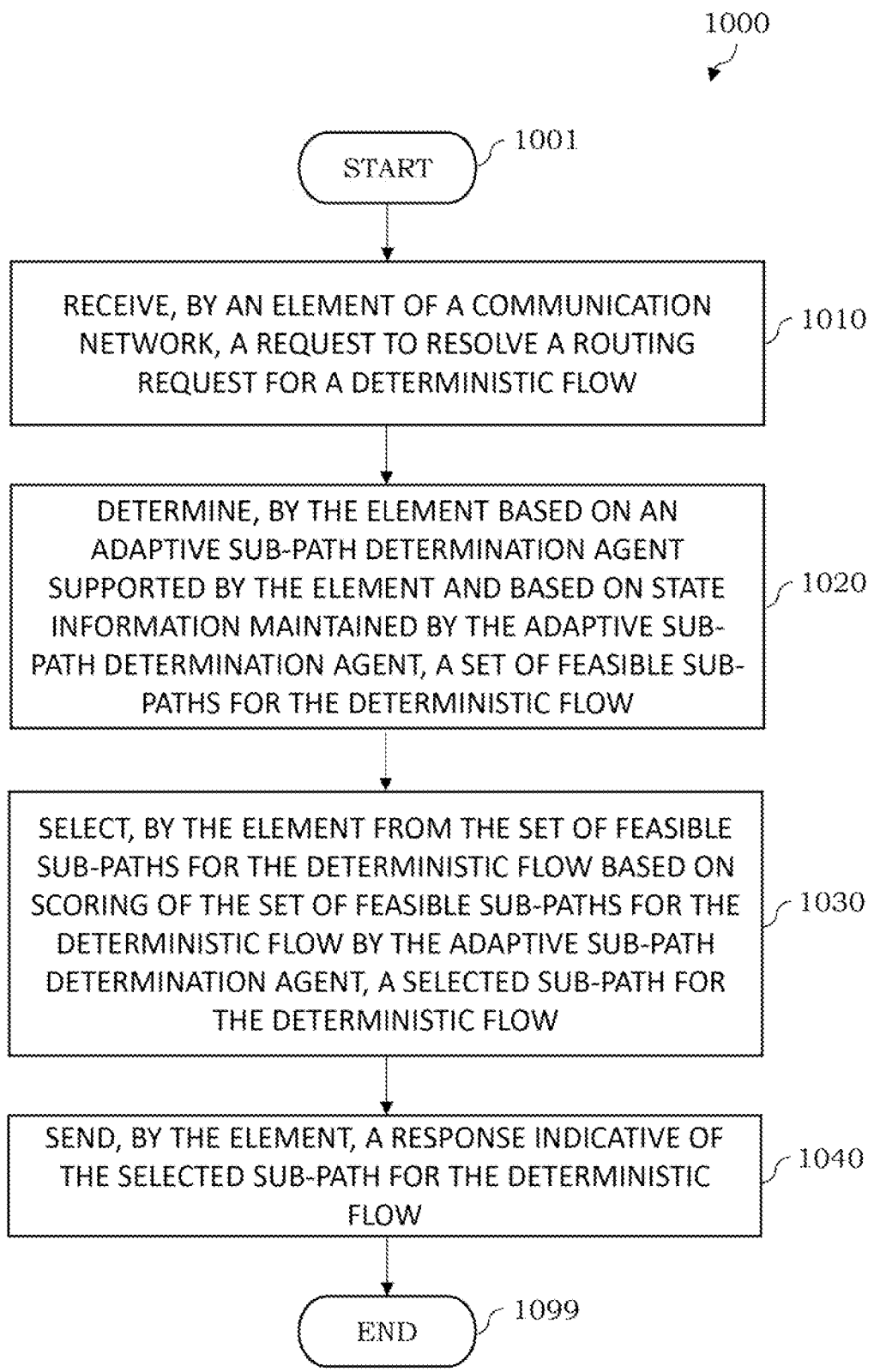
FIG. 10 depicts an example embodiment of a method for supporting provisioning of a deterministic flow in a multi-tier hierarchical network.

FIG. 10 depicts an example embodiment of a method for supporting provisioning of a deterministic flow in a multi-tier hierarchical network. It will be appreciated that although primarily presented as being performed serially, at least a portion of the blocks of method 1000 may be performed contemporaneously or in a different order than as presented in FIG. 10. At block 1001, the method 1000 begins. At block 1010, receive, by an element of a communication network, a request to resolve a routing request for a deterministic flow. At block 1020, determine, by the element based on an adaptive sub-path determination agent supported by the element and based on state information maintained by the adaptive sub-path determination agent, a set of feasible sub-paths for the deterministic flow. At block 1030, select, by the element from the set of feasible sub-paths for the deterministic flow based on scoring of the set of feasible sub-paths for the deterministic flow by the adaptive sub-path determination agent, a selected sub-path for the deterministic flow. At block 1040, send, by the element, a response indicative of the selected sub-path for the deterministic flow. At block 1099, the method 1000 ends.

Various example embodiments for supporting adaptive deterministic routing in multi-tier deterministic networks may provide various advantages or potential advantages. For example, various example embodiments for supporting adaptive deterministic routing in multi-tier deterministic networks may be configured to dynamically find end-to-end paths that can meet deterministic performance targets such as bounded performance measures (e.g., latency, jitter, or the like). For example, various example embodiments for supporting adaptive deterministic routing in multi-tier deterministic networks may be configured to find and propose paths between endpoints while also adapting the search depending on various factors (e.g., network conditions, deterministic targets, or the like, as well as various combinations thereof). For example, various example embodiments for supporting adaptive deterministic routing in multi-tier deterministic networks may be configured to leverage a clustered multi-tier IP network empowered by IEEE TSN and IETF DetNet protocol stacks and exploit deep reinforcement (machine) learning techniques which can dynamically approximate state/search space of path finding. For example, various example embodiments for supporting adaptive deterministic routing in multi-tier deterministic networks, based on the capability of hierarchical multi-tiered clustered networks to strike a balance between fully centralized and distributed approaches, may be configured to provide a more scalable solution for large-scale deterministic networks. For example, various example embodiments for supporting adaptive deterministic routing in multi-tier deterministic networks may be configured to provide an agent-based learning system and path finding mechanism that may capture several features of machine-learning empowered route finding mechanisms in networks. For example, various example embodiments for supporting adaptive deterministic routing in multi-tier deterministic networks may be configured to bring deterministic resource allocation to a larger geographical region. For example, various example embodiments for supporting adaptive deterministic routing in multi-tier deterministic networks may be configured to support representation of hierarchical clustered network topology compatible with latency-based zoning for frame replication and elimination in deterministic networking, hierarchical allocation and deallocation of deterministic resources in deterministic networks, resolution of deterministic end-to-end paths in a federated manner, learning of partial network state for optimal routing in deterministic communications, discovery and updating of link and flow states for deterministic routing, enabling deterministic networking in larger geographical areas, or the like, as well as various combinations thereof. Various example embodiments for supporting adaptive deterministic routing in multi-tier deterministic networks may provide various other advantages or potential advantages.

It will be appreciated that various example embodiments for supporting multi-tier deterministic networking may be configured to support various other functions for supporting adaptive deterministic routing in multi-tier deterministic networks.

It will be appreciated that, although primarily presented within the context of supporting adaptive deterministic routing in particular types of clustered networks (namely, multi-tier deterministic networks), various example embodiments for supporting adaptive deterministic routing as presented herein may be applied in various other types of clustered networks.

Various example embodiments for supporting multi-tier deterministic networking may be configured to support score-based deterministic routing in multi-tier deterministic networks.

Various example embodiments for supporting score-based deterministic routing in multi-tier deterministic networks may be configured to support a score-based distributed flow routing mechanism. Various example embodiments for supporting score-based deterministic routing in multi-tier deterministic networks may be configured to support a score-based flow routing mechanism where deterministic communications may be based on IEEE TSN, IETF DetNet, or the like. For example, various example embodiments of the score-based flow routing mechanism may be used for IETF DetNet network architectures (e.g., in order to enable fully deterministic networking) or, more generally, in multi-tier networks with a relatively large number of clusters. For example, various example embodiments of the score-based flow routing mechanism may be configured to use signaling and control mechanisms of the IEEE TSN protocol stack to seamlessly allocate and deallocate resources for deterministic flows. For example, various example embodiments of the score-based flow routing mechanism may be configured to use the IEEE TSN protocol stack to deliver packets with bounded performance guarantees. In this manner, the IETF DetNet and IEEE TSN protocol stacks may allow the routing protocol to achieve the goal of deterministic networking for various deterministic performance measured, in various environments in which deterministic networking may be applied, or the like, as well as various combinations thereof. For example, various example embodiments of the score-based flow routing mechanism may be configured to support score-based hierarchical flow allocation and routing capabilities for deterministic clustered networks. For example, various example embodiments of the score-based flow routing mechanism may be configured to enable nodes to find end-to-end deterministic flow paths that can satisfy deterministic performance targets such as bounded latency and jitter. For example, various example embodiments of the score-based flow routing mechanism may be configured to leverage a clustered multi-tier IP network, empowered by IEEE TSN and/or IETF DetNet protocol stacks, while exploiting a score-based bin-packing-like heuristic that can dynamically find feasible paths between pairs of endpoints. For example, various example embodiments of the score-based flow routing mechanism may be configured to utilize techniques which can dynamically approximate the state/search space of path finding. For example, various example embodiments of the score-based flow routing mechanism may be configured to enable nodes to find and propose paths between two endpoints, and to dynamically adapts the search depending on network conditions and deterministic targets, irrespective of whether the target network is a clustered multi-tiered network or a non-hierarchical network. For example, various example embodiments of the score-based flow routing mechanism may be configured to support a balance between centralized and decentralized flow allocation while also taking into account hierarchical clustered aspects of the network as well as deterministic traffic which may be transported within such a network. For example, various example embodiments of the score-based flow routing mechanism may be configured to support various other functions for supporting adaptive deterministic routing.

Various example embodiments for supporting score-based deterministic routing in multi-tier deterministic networks may be further understood by considering the networks of FIG. 1, FIG. 2, FIG. 3, and/or FIG. 6. It will be appreciated that the multi-tier deterministic network in which score-based deterministic routing is applied may be formed in various ways, e.g., statically (e.g., using approaches defined by the network operator), dynamically using algorithmic approaches (e.g., with predefined intents, constraints, and performance conditions), dynamically as presented herein with respect to FIGS. 2-3, or the like, as well as various combinations thereof.

Figure 11:
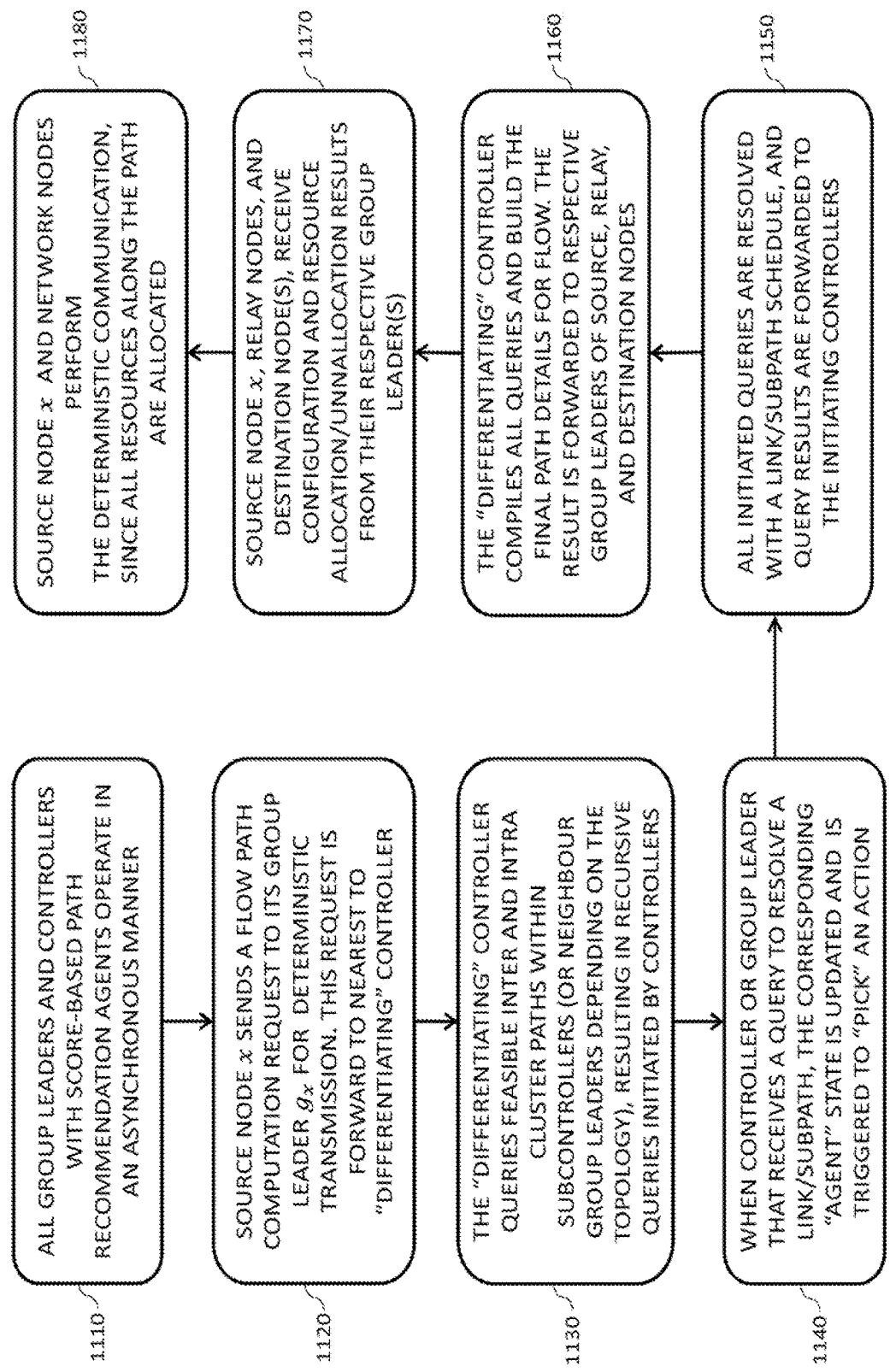
FIG. 11 depicts an example embodiment of a method for supporting provisioning of a deterministic flow in a multi-tier hierarchical network.

FIG. 11 depicts an example embodiment of a method for supporting provisioning of a deterministic flow in a multi-tier hierarchical network. For purposes of clarity, the method 1100 is primarily described within the context of an example based on FIG. 3 in which node A wishes to communicate to node N using a deterministic flow or based on FIG. 6 in which node C wishes to communicate to node L using a deterministic flow.

At block 1110, the group leaders and controllers with score-based path recommendation agents operate in an asynchronous manner. The group leader nodes and controllers, each of them having an agent that can be queried for a potential action that translates into a feasible link/sub-path, which may be used later to compile a final path. A score-based path recommendation agent and environment may have the properties and behavior as presented in FIG. 12.

At block 1120, a source node x sends a flow path computation request to its group leader $g_x$ for deterministic transmission. This request is forwarded to the nearest "differentiating" controller. The differentiating controller is a controller that has global knowledge of all group leaders under its administration, potentially somewhere up in the hierarchy, not always necessarily the top controller.

At block 1130, the differentiating controller queries feasible inter-cluster and intra-cluster paths within sub-controllers (or neighbor group leaders depending on the topology), resulting in recursive queries initiated by controllers. Each sub-controller or neighbor group leader (acting as an environment) receiving a respective query interacts with its agent to find and schedule resources for a link/sub-path under its administration.

At block 1140, when a controller or group leader that receives a query to resolve a link/sub-path, the corresponding "path agent" state is updated and is triggered to "pick" an action.

At block 1150, all initiated queries are resolved with a link/sub-path schedule, and query results are forwarded to the initiating controllers.

At block 1160, the differentiating controller compiles all queries and builds the final path details for the deterministic flow. The result is forwarded to respective group leaders of the source and destination nodes.

At block 1170, the source node x, relay nodes, and destination nodes receive configuration and resource allocation/unallocation results from their respective group leader(s). In case of failure of allocating the resources in any node, the differentiating controller is expected to be informed by the related node(s), in which case it relays this information to all relevant entities of the path.

At block 1180, the source node x and the network nodes perform the deterministic communication, since all resources along the path are allocated.

Figure 12:
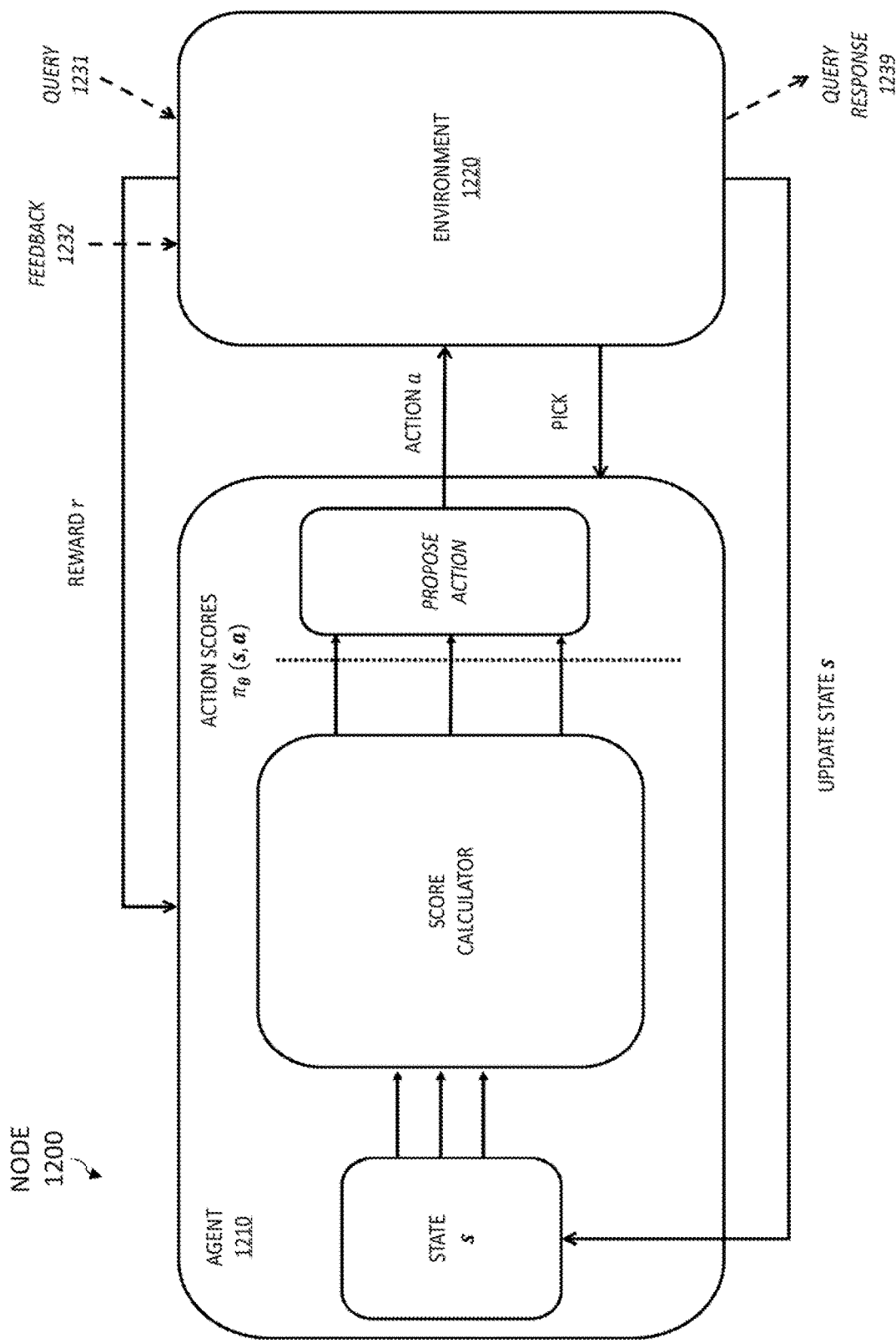
FIG. 12 depicts an example embodiment of a node including a score-based path recommendation agent configured to determine a path for a deterministic flow.

FIG. 12 depicts an example embodiment of a node including a score-based path recommendation agent configured to determine a path for a deterministic flow. It will be appreciated that the score-based path recommendation agent in the node 1200 of FIG. 12 may be suitable for use in performing various blocks of the method 1100 of FIG. 11 (e.g., block 1110).

In FIG. 12, the agent 1210 is a score-based flow agent configured to support learning and link/sub-path recommendations.

In FIG. 12, the environment 1220 represents an abstraction of a group leader node or controller (e.g., internal state and mechanics of a group leader node or controller), which interacts with its agent when a link/sub-path recommendation is needed.

In FIG. 12, a query message 1231 might arrive from controllers or other group leaders to resolve a flow routing request between two nodes, and depending on the configuration and internal state, the environment 1220 then (1) refreshes its internal state (discussed in detail further below) that is shared with the agent 1210 via an update state signal s, (2) sends a pick signal p to the agent 1210 to find a potential link/sub-path for the flow routing request, (3) choses one of the link/sub-path candidates (namely proposed actions/recommendations) given by the agent 1210, and (4) informs the requesting group leader or controller about link/sub-path choice via a query response message 1239.

In FIG. 12, after the usage of the related link/sub-path is freed from a given flow, the environment 1220 then receives a delayed feedback message 1232 from related controllers such that it can calculate a reward function. This reward function can be measuring difference between expected and actual flow completion time or any other relevant performance metric. The result of reward function, namely reward r, is communicated to the agent 1210 via internal signaling between the environment 1220 and its agent 1210. In addition to this, the environment 1220 might also receive other types of feedback messages (e.g., inter/intra-cluster link load status and other key performance indicators) with the ultimate aim of having a better state representation of the network for resource optimization.

In FIG. 12, given an observed state matrix as input, the agent 1210 is essentially a score calculator of feasible links/sub-paths which can be proposed by the agent 1210 when requested via the pick signal p. The output of the score calculator is called action scores π(s, a) and is a vector that represents a list of potential actions with score values, effectively representing recommendations for links/sub-paths.

In FIG. 12, the environment 1220 keeps a state representation for deterministic flow scheduling that is shared with the agent 1210. The state representation for deterministic flow scheduling may be a two (or more) dimensional state matrix which may be padded with zeroes as needed. The state representation for deterministic flow scheduling may be a two (or more) dimensional state matrix which may be padded with zeroes as needed. An example of such a state matrix providing a state representation for deterministic flow scheduling is presented in FIG. 13.

Figure 13:
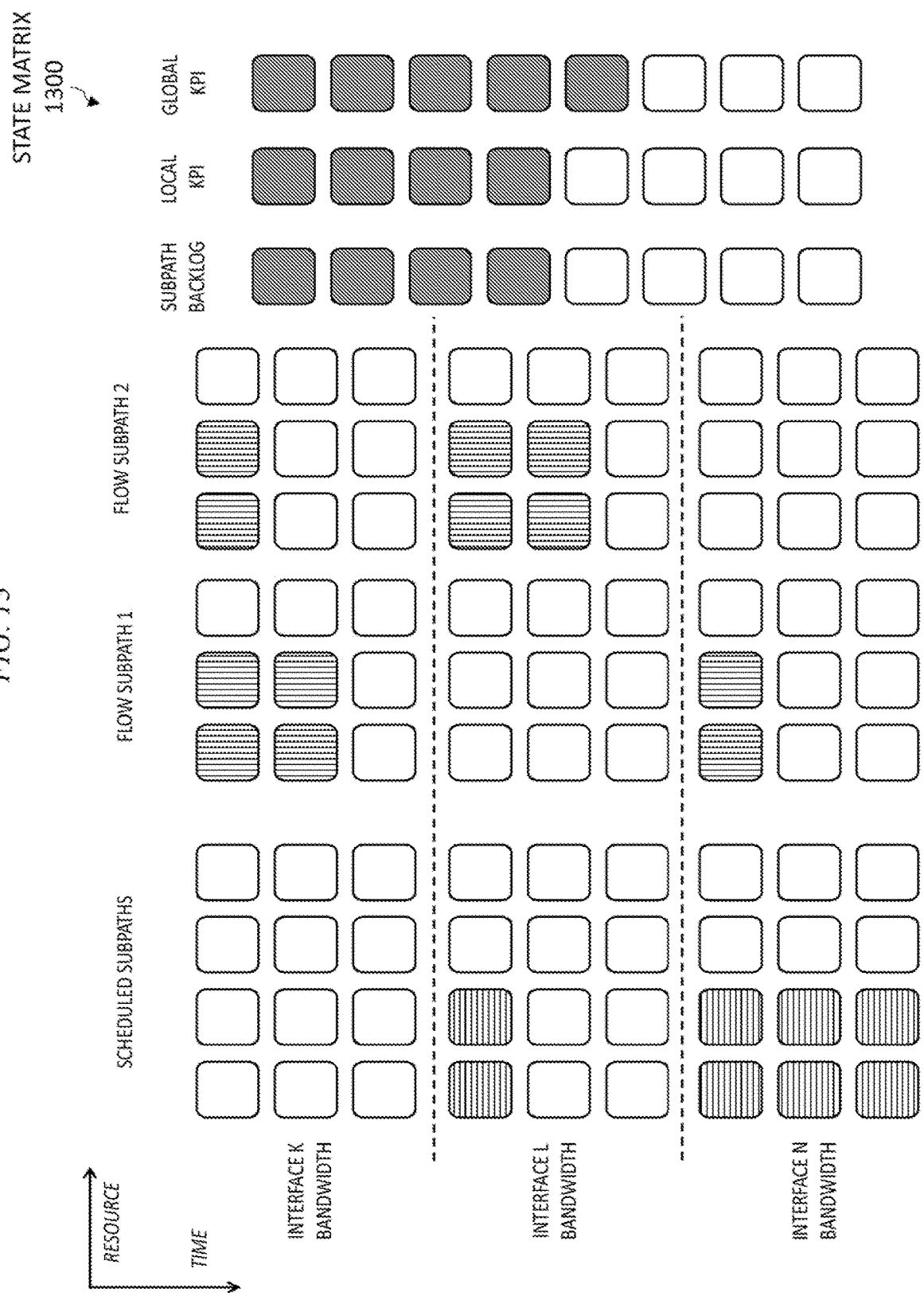
FIG. 13 depicts an example embodiment of a state matrix providing a state representation for deterministic flow scheduling.

In FIG. 13, the state matrix 1300 maintained by a node for supporting deterministic flow scheduling includes three blocks that represent the scheduled sub-paths, candidate deterministic flow sub-paths that are waiting to be scheduled, and support metrics, respectively. It is noted that the state matrix 1300 of FIG. 13 is similar to the state matrix 900 of FIG. 9 in terms of organization of the state information, but that a different example is presented.

In FIG. 13, the scheduled sub-paths are represented in the first block of the matrix. This scheduled sub-paths block in the matrix represents the information about scheduled deterministic sub-paths that is distributed across multiple interfaces of the environment (which might include multiple interfaces with various bandwidth requirements, latency requirements, or other type of requirements). The rows represent the amount of resource usage over time slots, and the columns represent the amount of resources in a given location. For example, a scheduled flow in with horizontal hatching is consuming two units of bandwidth both at interface K and interface N at time slot 1, and again will be consuming two units of bandwidth at the next time slot (time slot 2). It will be appreciated that, although primarily presented with respect to use of bandwidth requirements in the state representation, various other types of requirements may be specified within the state representation (e.g., blocks for delay requirements, blocks for other resource requirements, or the like, as well as various combinations thereof for supporting deterministic and time-sensitive transmissions.

In FIG. 13, candidate deterministic flow links/sub-path that arrive to the scheduling system (waiting to be scheduled) are represented in the middle block of the matrix. For example, Flow sub path 1 requires two units of bandwidth resources at interface L at time slot 1, and also requires two units of bandwidth resources at interface N at time slot 1. It is noted that, since the number of candidate link/sub-path scheduling requests that arrive to system can be large, the matrix may be restricted to represent only first predefined number of arrivals as an approximation and the rest may be quantified in a sub-path backlog block maintained as part of the last block of the matrix. It is noted that, although only two arrived feasible sub-path choices for the same flow (represented with the vertical hatching) are depicted for purposes of clarity, there might be multiple feasible solutions of multiple flows which may be represented within the matrix.

In FIG. 13, certain support metrics are represented in the last block of the matrix. These metrics may include various metrics which may facilitate a more efficient scheduling of deterministic flows. One such metric, as indicated above, may be the sub-path backlog block. Other metrics, as illustrated in FIG. 13, may include local and global key performance indicator (KPI) metrics, which could be related to link states, a reward function, or the like. It will be appreciated that the last block of the matrix may include various other metrics configured to facilitate a more efficient scheduling of deterministic flows.

In FIG. 12, the agent 1210, whenever requested by the environment 1220 via a pick signal p, considers its input, and proposes a vector of action scores/preferences. Here, each action score a at the output represents a numerical score/value for given feasible links/sub-paths that are waiting in the environment 1220. Each numerical score/value is a result of a score function that is a linear function composed of one or more factors. Examples of these scoring functions may include a shortest link/sub-path first heuristic that scores actions in increasing order of their duration, a packer or tetric-like heuristic that scores actions in increasing order of alignment between arrived links/sub-paths and resource availability, a multi-dimensional in packer heuristic, any other score calculation considering internal state and waiting links/sub-paths, or the like, as well as various combinations thereof.

In FIG. 12, given these preferences, the environment 1220 effectively decides to act on the highest scored action, meaning it puts the selected solution into its scheduled queue and updates its state. The scheduled interfaces for such a route, as described herein, is disseminated to the related controllers via the query response 1239.

It will be appreciated that as the system keeps operating in this manner then, ultimately, every controller and group leader (each of them having their own agent) contributes to a hierarchical recursive system of path finding in the clustered network.

Figure 14:
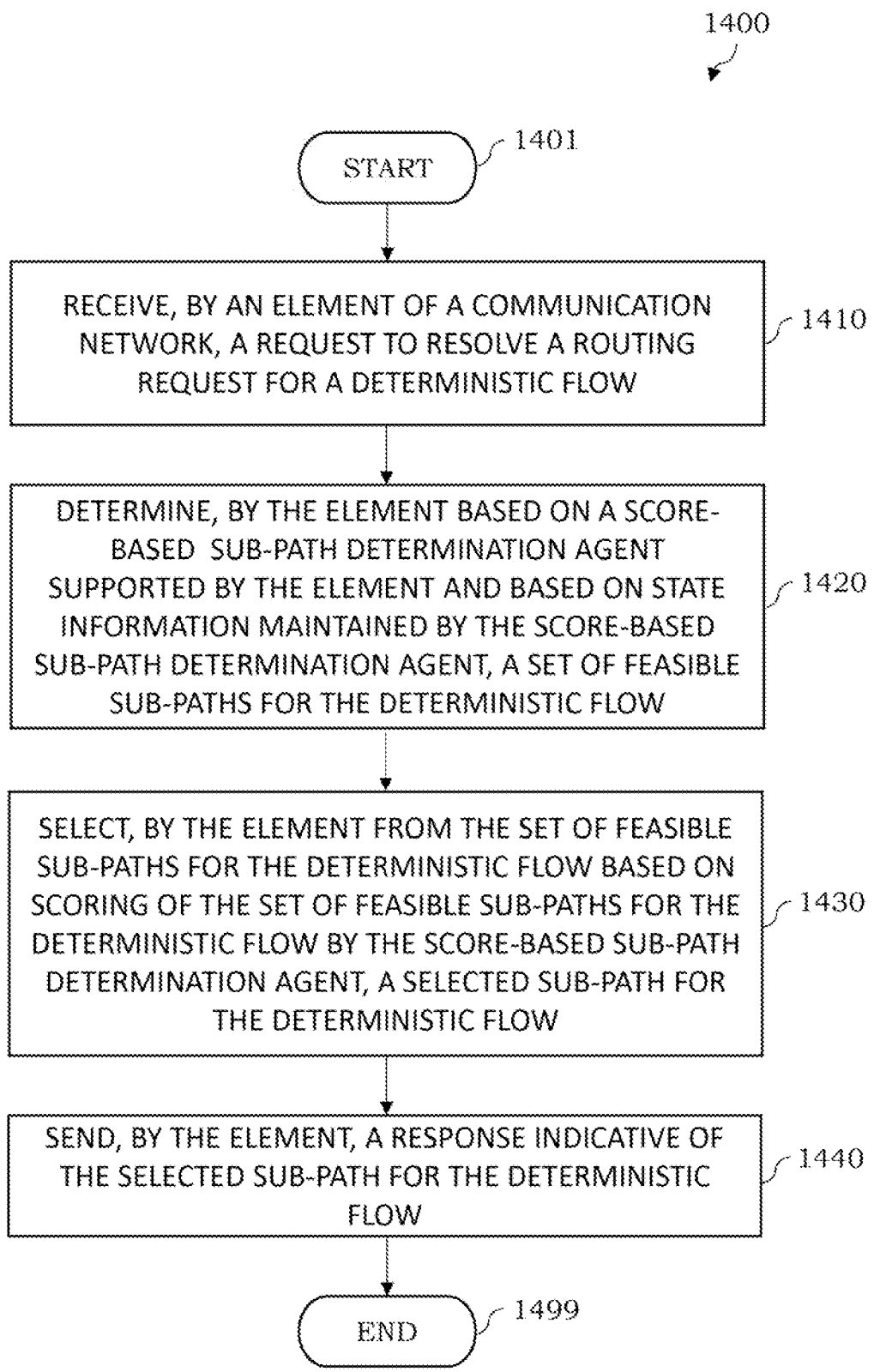
FIG. 14 depicts an example embodiment of a method for supporting provisioning of a deterministic flow in a multi-tier hierarchical network.

FIG. 14 depicts an example embodiment of a method for supporting provisioning of a deterministic flow in a multi-tier hierarchical network. It will be appreciated that although primarily presented as being performed serially, at least a portion of the blocks of method 1400 may be performed contemporaneously or in a different order than as presented in FIG. 14. At block 1401, the method 1400 begins. At block 1410, receive, by an element of a communication network, a request to resolve a routing request for a deterministic flow. At block 1420, determine, by the element based on a score-based sub-path determination agent supported by the element and based on state information maintained by the score-based sub-path determination agent, a set of feasible sub-paths for the deterministic flow. At block 1430, select, by the element from the set of feasible sub-paths for the deterministic flow based on scoring of the set of feasible sub-paths for the deterministic flow by the score-based sub-path determination agent, a selected sub-path for the deterministic flow. At block 1440, send, by the element, a response indicative of the selected sub-path for the deterministic flow. At block 1499, the method 1400 ends.

Various example embodiments for supporting score-based deterministic routing in multi-tier deterministic networks may provide various advantages or potential advantages. For example, various example embodiments for supporting score-based deterministic routing in multi-tier deterministic networks may be configured to dynamically find end-to-end paths that can meet deterministic performance targets such as bounded latency and jitter. For example, various example embodiments for supporting score-based deterministic routing in multi-tier deterministic networks may be configured to find and propose paths between endpoints while also adapting the search depending on various factors (e.g., network conditions, deterministic targets, or the like, as well as various combinations thereof). For example, various example embodiments for supporting score-based deterministic routing in multi-tier deterministic networks may be configured to leverage a clustered multi-tier IP network empowered by IEEE TSN and IETF DetNet protocol stacks and exploit a score-based bin-packing-like heuristic that can hierarchically find feasible paths between points. For example, various example embodiments for supporting score-based deterministic routing in multi-tier deterministic networks, based on the capability of hierarchical multi-tiered clustered networks to strike a balance between fully centralized and distributed approaches, may be configured to provide a more scalable solution for large-scale deterministic networks. For example, various example embodiments for supporting score-based deterministic routing in multi-tier deterministic networks may be configured to provide a score-based agent and path finding mechanism that may capture several heuristics for route finding mechanisms in networks. For example, various example embodiments for supporting score-based deterministic routing in multi-tier deterministic networks may be configured to bring deterministic resource allocation to a larger geographical region. For example, various example embodiments for supporting score-based deterministic routing in multi-tier deterministic networks may be configured to support representation of a hierarchical clustered network topology compatible with latency-based zoning for frame replication and elimination in deterministic networking, hierarchical allocation and deallocation of deterministic resources in deterministic networks, resolution of deterministic end-to-end paths in a federated manner, heuristically finding routes for optimal routing in deterministic communications, discovery and updating of link and flow states for deterministic routing, enabling deterministic networking in larger geographical areas, or the like, as well as various combinations thereof. Various example embodiments for supporting score-based deterministic routing in multi-tier deterministic networks may provide various other advantages or potential advantages.

It will be appreciated that various example embodiments for supporting multi-tier deterministic networking may be configured to support various other functions for supporting score-based deterministic routing in multi-tier deterministic networks.

Figure 15:
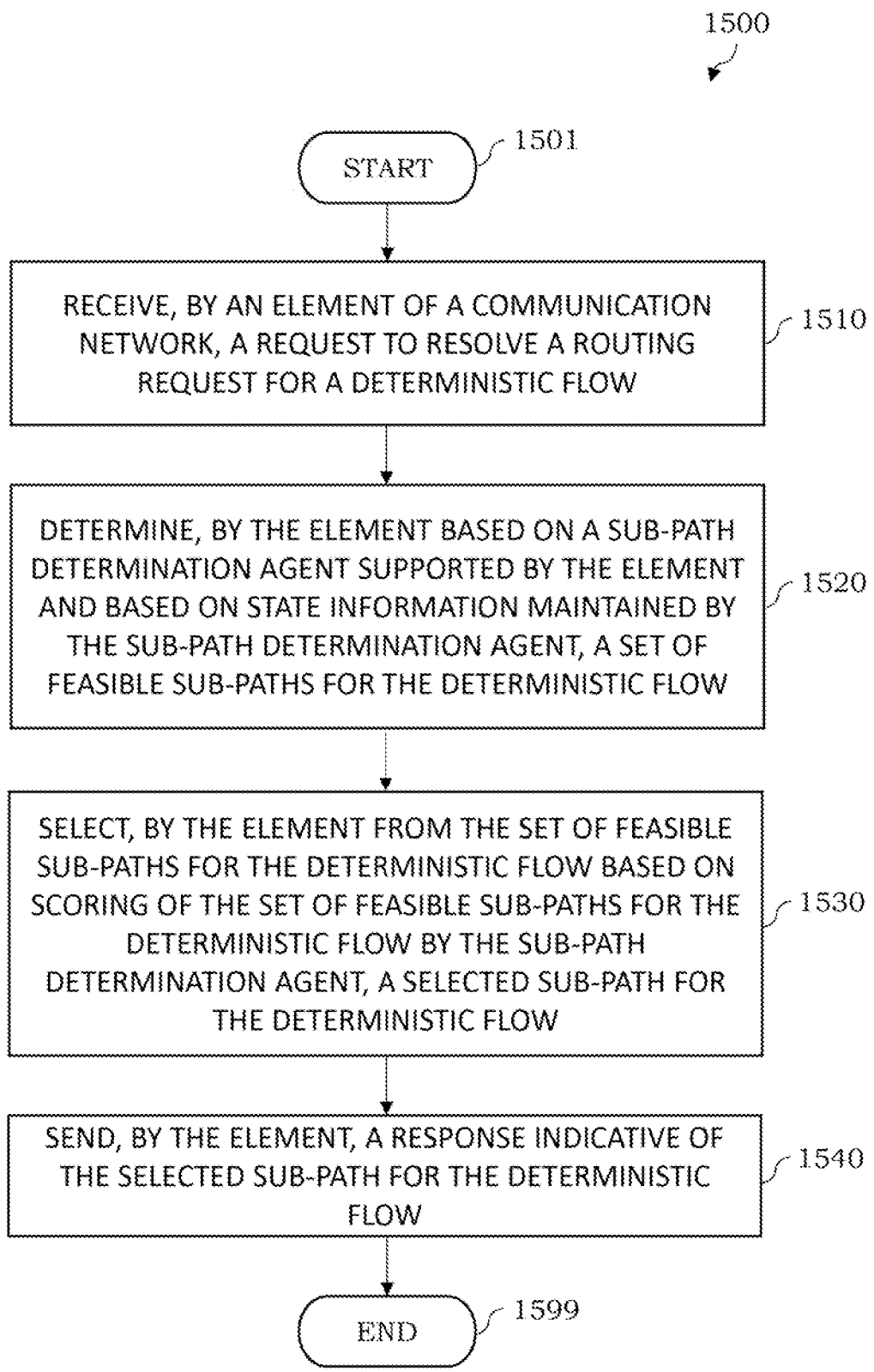
FIG. 15 depicts an example embodiment of a method for supporting provisioning of a deterministic flow in a multi-tier hierarchical network.

FIG. 15 depicts an example embodiment of a method for supporting provisioning of a deterministic flow in a multi-tier hierarchical network. It will be appreciated that although primarily presented as being performed serially, at least a portion of the blocks of method 1500 may be performed contemporaneously or in a different order than as presented in FIG. 15. At block 1501, the method 1500 begins. At block 1510, receive, by an element of a communication network, a request to resolve a routing request for a deterministic flow. At block 1520, determine, by the element based on a sub-path determination agent supported by the element and based on state information maintained by the sub-path determination agent, a set of feasible sub-paths for the deterministic flow. At block 1530, select, by the element from the set of feasible sub-paths for the deterministic flow based on scoring of the set of feasible sub-paths for the deterministic flow by the sub-path determination agent, a selected sub-path for the deterministic flow. At block 1540, send, by the element, a response indicative of the selected sub-path for the deterministic flow. At block 1599, the method 1500 ends.

Figure 16:
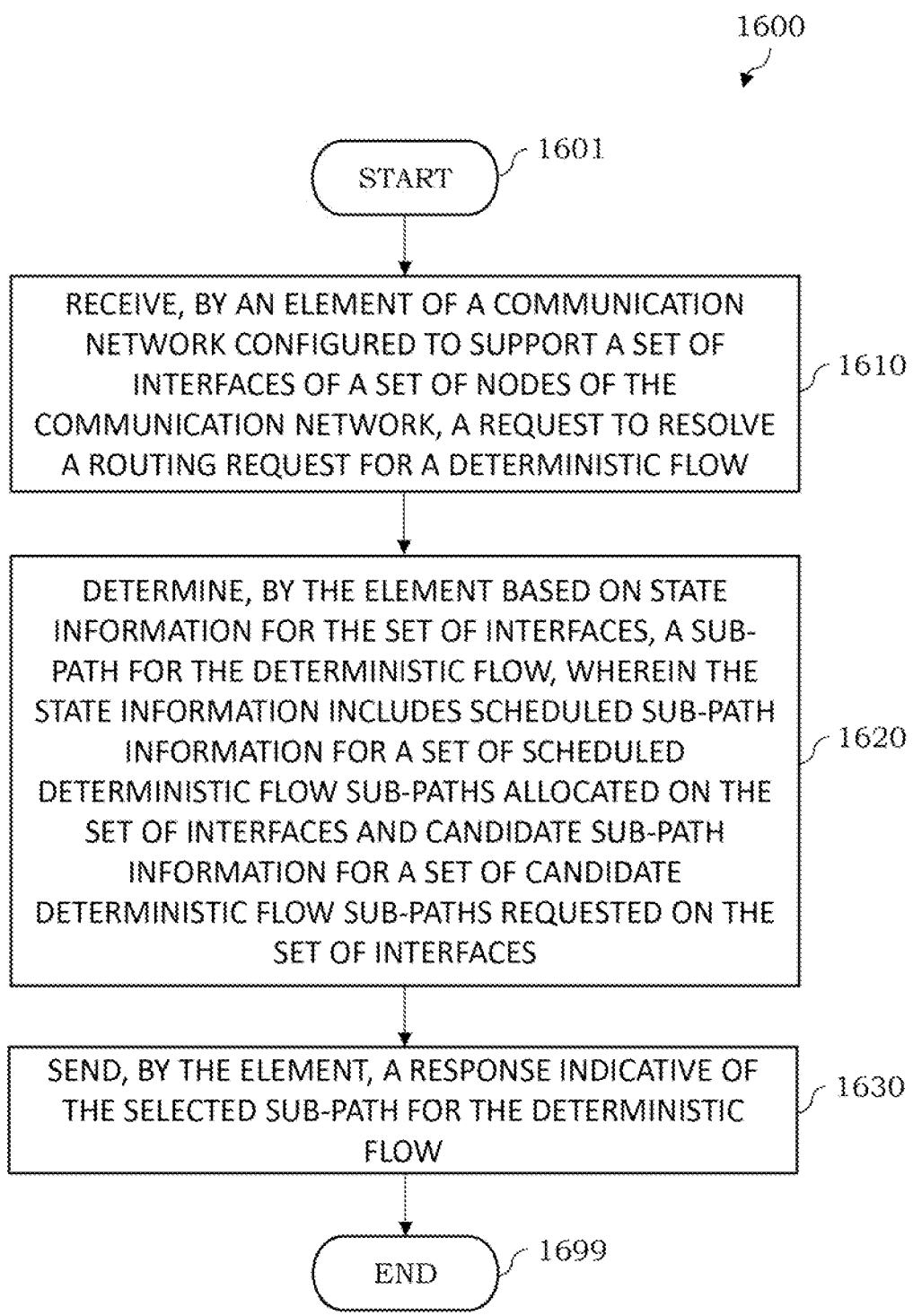
FIG. 16 depicts an example embodiment of a method for supporting provisioning of a deterministic flow in a multi-tier hierarchical network

FIG. 16 depicts an example embodiment of a method for supporting provisioning of a deterministic flow in a multi-tier hierarchical network. It will be appreciated that although primarily presented as being performed serially, at least a portion of the blocks of method 1600 may be performed contemporaneously or in a different order than as presented in FIG. 16. At block 1601, the method 1600 begins. At block 1610, receive, by an element of a communication network configured to support a set of interfaces of a set of nodes of the communication network, a request to resolve a routing request for a deterministic flow. At block 1620, determine, by the element based on state information for the set of interfaces, a sub-path for the deterministic flow, wherein the state information includes scheduled sub-path information for a set of scheduled deterministic flow sub-paths allocated on the set of interfaces and candidate sub-path information for a set of candidate deterministic flow sub-paths requested on the set of interfaces. At block 1630, send, by the element, a response indicative of the selected sub-path for the deterministic flow. At block 1699, the method 1600 ends.

Figure 17:
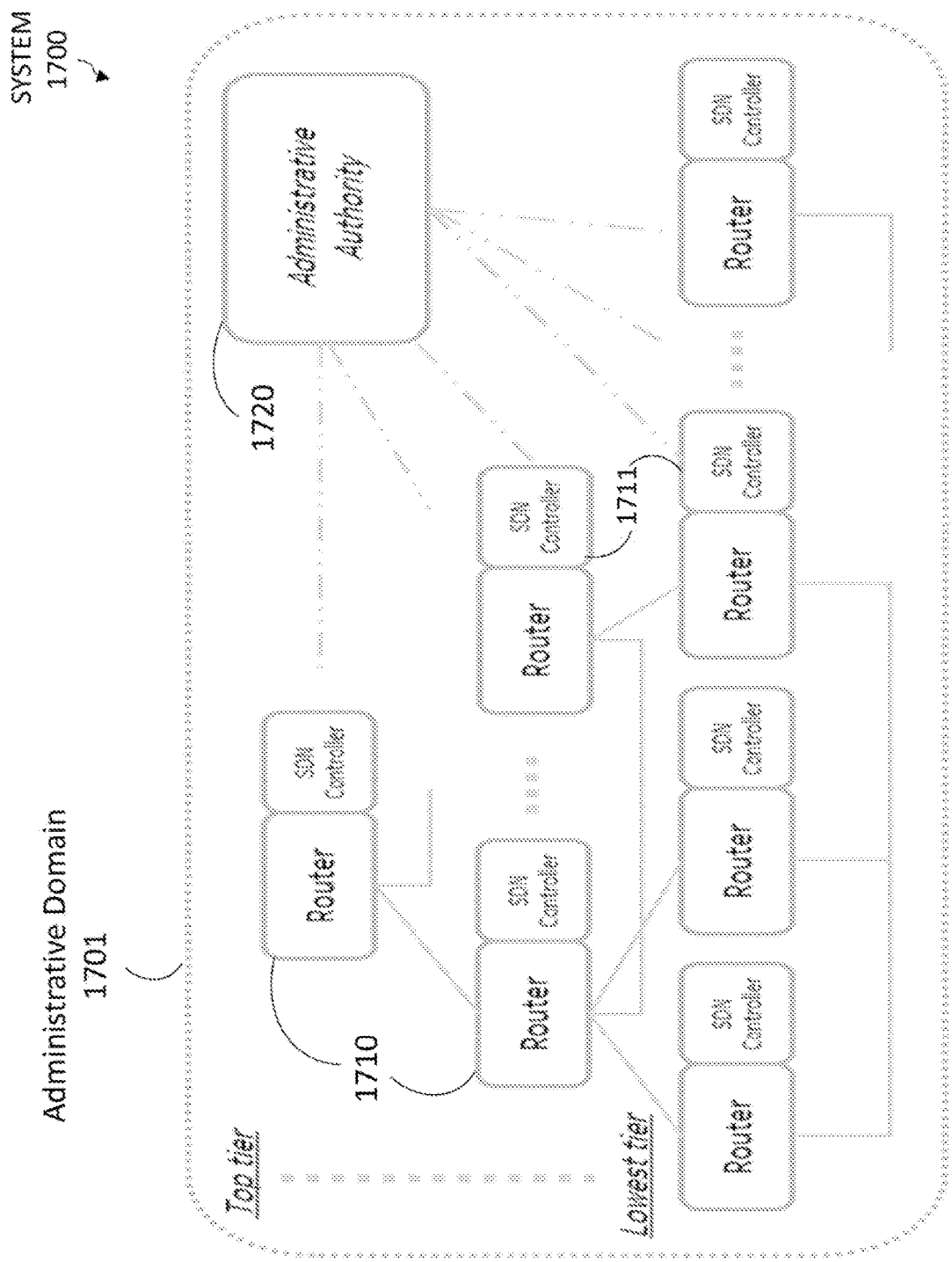
FIG. 17 depicts an example embodiment of a system configured to support multi-tier deterministic networking.

FIG. 17 depicts an example embodiment of a system configured to support multi-tier deterministic networking. The system 1700 includes an administrative domain 1701 including a set of routers 1710 and an administrative authority 1720. The administrative domain 1701 may be defined at any suitable granularity, which may be based on various factors (e.g., a regional telco network, a datacenter, a university campus network, or the like). The administrative domain 1701 may be arranged hierarchically in two or more tiers, with the administrative authority 1720 (and possibly one or more routers 1610) at the top tier and the routers 1710 arranged in one or more lower tiers. The routers 1710 include SDN capabilities represented as SDN controllers 1711 associated with the routers 1710, respectively. The routers 1710 are configured to support multi-tier deterministic networking. The routers 1710 may interact with each other in the administrative domain, depending on roles, in order to support multi-tier deterministic networking as presented herein. The administrative authority 1720 is configured to control various aspects of the operation of the routers 1710, such as supporting capabilities for configuring, monitoring, and managing the routers 1710. It is noted that, while omitted for purposes of clarity, an API may be available to non-router entities of the administrative domain 1701 which are willing to use end-to-end deterministic transmission through the network (e.g., a personal computer or smartphone connected to the network, an edge computer or base station delivering information to one or more other network elements, or the like), thereby enabling end users and applications to dynamically leverage deterministic capabilities of network programmability as needed or desired. It will be appreciated that, while primarily presented with respect to example embodiments in which each router is equipped with an SDN controller, in at least some example embodiments only a portion of the SDN controllers (e.g., SDN controllers of routers 1710 located in one or more upper tiers of the hierarchy) may be used to support example embodiments for supporting multi-tier deterministic networking, in at least some example embodiments only a portion of the routers 1710 may include SDN controllers, or the like, as well as various combinations thereof. It will be appreciated that, although presented with respect to a particular arrangement of the routers 1710, the routers 1710 may be arranged in various other topologies (e.g., tree-like, leaf-spine, or using any other suitable topologies) or even an arbitrary connectivity structure with a tiered mechanism.

Various example embodiments for supporting multi-tier deterministic networking may provide various advantages or potential advantages. For example, various example embodiments for supporting multi-tier deterministic networking may be configured to support provisioning of deterministic flows in multi-tier deterministic networking, adaptive deterministic routing in multi-tier deterministic networks, score-based deterministic routing in multi-tier deterministic networks, or the like, as well as various combinations thereof. Various example embodiments for supporting multi-tier deterministic networking may provide various other advantages or potential advantages.

Figure 18:
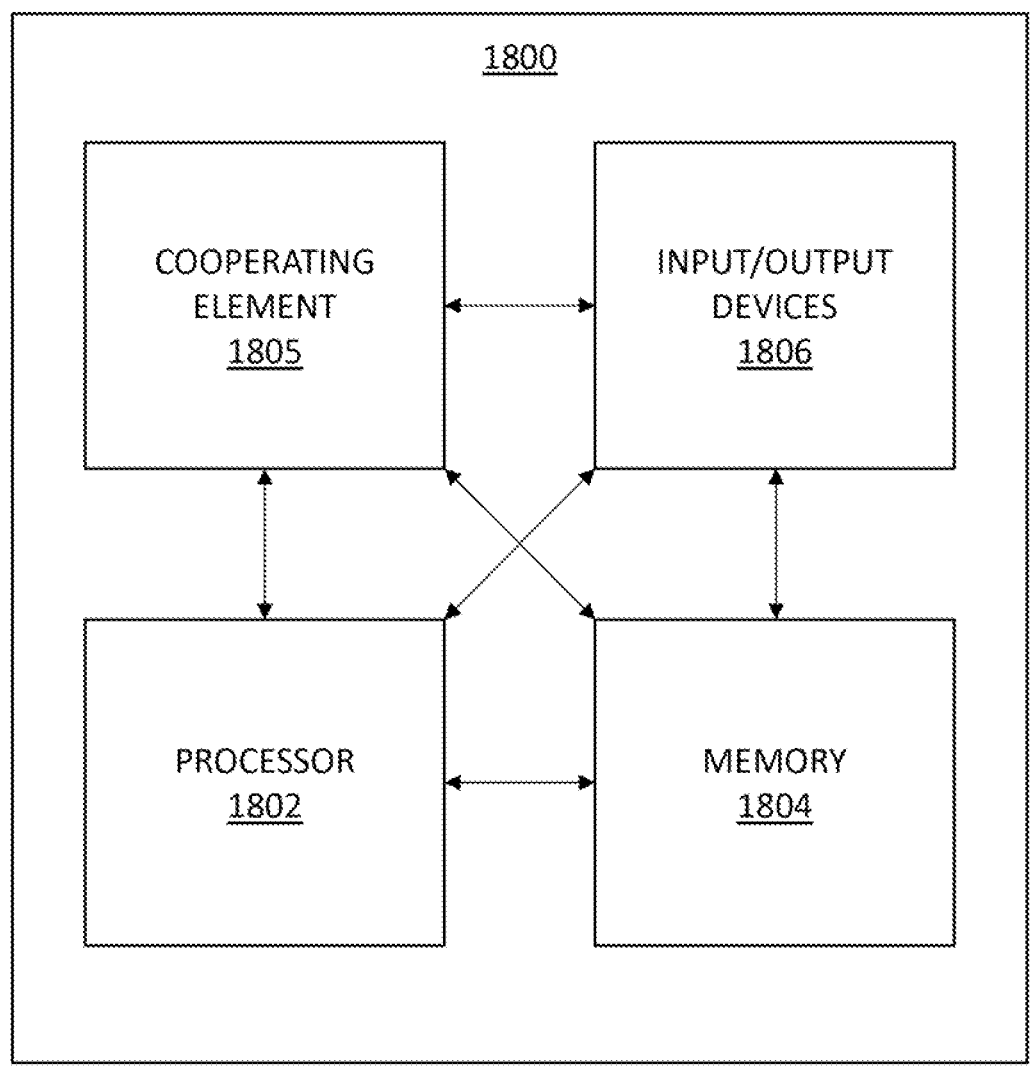
FIG. 18 depicts an example embodiment of a computer suitable for use in performing various functions presented herein.

FIG. 18 depicts an example embodiment of a computer suitable for use in performing various functions presented herein.

The computer 1800 includes a processor 1802 (e.g., a central processing unit (CPU), a processor, a processor having a set of processor cores, a processor core of a processor, or the like) and a memory 1804 (e.g., a random access memory, a read only memory, or the like). The processor 1802 and the memory 1804 may be communicatively connected. In at least some example embodiments, the computer 1800 may include at least one processor and at least one memory including a set of instructions, wherein the set of instructions is configured to, when executed by the at least one processor, cause the computer to perform various functions presented herein.

The computer 1800 also may include a cooperating element 1805. The cooperating element 1805 may be a hardware device. The cooperating element 1805 may be a process that can be loaded into the memory 1804 and executed by the processor 1802 to implement various functions presented herein (in which case, for example, the cooperating element 1805 (including associated data structures) can be stored on a non-transitory computer-readable storage medium, such as a storage device or other suitable type of storage element (e.g., a magnetic drive, an optical drive, or the like)).

The computer 1800 also may include one or more input/output devices 1806. The input/output devices 1806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1800 may represent a general architecture and functionality suitable for implementing functional elements described herein, portions of functional elements described herein, or the like, as well as various combinations thereof. For example, computer 1800 may provide a general architecture and functionality that is suitable for implementing one or more elements presented herein, such as a network devices (e.g., routers, switches, or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory storing instructions that, when executed by the at least one processor, cause the apparatus at least to:
receive, by a node configured to operate within a multi-tier communication network including at least a first tier and a second tier, a request to support a deterministic flow, wherein the node is configured to operate as a cluster leader for a cluster of nodes of the first tier and to communicate with a controller of the second tier;
send, by the node toward the controller of the second tier based on a determination by the node that the deterministic flow is unable to be resolved within the cluster of nodes of the first tier, the request to support the deterministic flow; and
receive, by the node from the controller of the second tier, a response indicative as to whether the deterministic flow has been resolved within the multi-tier communication network.

2. The apparatus of claim 1, wherein the second tier includes a set of nodes, wherein the set of nodes includes the cluster of nodes of the first tier and includes a second cluster of nodes of the first tier that is managed by a second cluster leader.

3. The apparatus of claim 1, wherein the determination by the node that the deterministic flow is unable to be resolved within the cluster of nodes of the first tier is based on an identification vector of a source node of the deterministic flow and an identification vector of a destination node of the deterministic flow.

4. The apparatus of claim 3, wherein the identification vector of the source node of the deterministic flow includes an identifier of the source node within the cluster of nodes of the first tier, an identifier of the cluster of nodes of the first tier, and an identifier of a second cluster of nodes of the second tier with which the source node is associated.

5. The apparatus of claim 3, wherein the identification vector of the destination node of the deterministic flow includes an identifier of the destination node within a second cluster of nodes of the first tier with which the destination node is associated, an identifier of the second cluster of nodes of the first tier with which the destination node is associated, and an identifier of a second cluster of nodes of the second tier with which the destination node is associated.

6. The apparatus of claim 1, wherein the determination by the node that the deterministic flow is unable to be resolved within the cluster of nodes of the first tier is based on identification of a mismatch between a first cluster identifier of a first cluster of nodes of the first tier with which the source node is associated and a second cluster identifier of a second cluster of nodes of the first tier with which the destination node is associated.

7. The apparatus of claim 1, wherein the instructions, when executed by the at least one processor, cause the apparatus at least to:
send, by the node toward a second node of the deterministic flow that is located within the cluster of nodes of the first tier, configuration information for configuring the second node to support the deterministic flow.

8. The apparatus of claim 1, wherein the instructions, when executed by the at least one processor, cause the apparatus at least to:
allocate, at the node based on the response, resources for supporting the deterministic flow.

9. The apparatus of claim 8, wherein the resources for supporting the deterministic flow include at least one of bandwidth resources or time slot resources.

10. The apparatus of claim 8, wherein the resources for supporting the deterministic flow are allocated based on triggering of a deterministic protocol stack at the node.

11. A method, comprising:
receiving, by a node configured to operate within a multi-tier communication network including at least a first tier and a second tier, a request to support a deterministic flow, wherein the node is configured to operate as a cluster leader for a cluster of nodes of the first tier and to communicate with a controller of the second tier;
sending, by the node toward the controller of the second tier based on a determination by the node that the deterministic flow is unable to be resolved within the cluster of nodes of the first tier, the request to support the deterministic flow; and
receiving, by the node from the controller of the second tier, a response indicative as to whether the deterministic flow has been resolved within the multi-tier communication network.

12. An apparatus, comprising:
at least one processor; and
at least one memory storing instructions that, when executed by the at least one processor, cause the apparatus at least to:
receive, for a multi-tier communication network including at least a first tier and a second tier, a request to support a deterministic flow, wherein the request is received by a controller configured to control a cluster of nodes of the second tier, wherein the request is received from a node operating as a cluster leader of a cluster of nodes of the first tier, wherein the cluster of nodes of the first tier forms part of the cluster of nodes of the second tier;
obtain, by the controller based on at least one of a query to a second controller configured to control a second cluster of nodes of the second tier or a query to a second node operating as a cluster leader of a second cluster of nodes of the first tier, information indicative of deterministic resources available within the multi-tier communication network to support the deterministic flow; and
send, by the controller toward the node operating as the cluster leader of the cluster of nodes of the first tier, a response indicative as to whether the deterministic flow has been resolved within the multi-tier communication network.

13. The apparatus of claim 12, wherein the information indicative of deterministic resources available within the multi-tier communication network to support the deterministic flow is obtained based on the query to the second controller configured to control the second cluster of nodes of the second tier and the query to the second node operating as the cluster leader of the second cluster of nodes of the first tier.

14. The apparatus of claim 13, wherein, to obtain the information indicative of deterministic resources available within the multi-tier communication network to support the deterministic flow, the instructions, when executed by the at least one processor, cause the apparatus at least to:
receive, by the controller, a first response to the query to the second controller configured to control the second cluster of nodes of the second tier and a second response to the query to the second node operating as the cluster leader of the second cluster of nodes of the first tier; and
determine, based on the first response and the second response, the information indicative of deterministic resources available within the multi-tier communication network to support the deterministic flow.

15. The apparatus of claim 12, wherein the query to the second controller configured to control the second cluster of nodes of the second tier includes a query for feasible inter-cluster paths between the first cluster of nodes of the second tier and the second cluster of nodes of the second tier.

16. The apparatus of claim 12, wherein the query to the second node operating as the cluster leader of the second cluster of nodes of the first tier includes at least one of a query for feasible intra-cluster paths of the second cluster of nodes of the first tier or a query for feasible inter-cluster paths between the first cluster of nodes of the first tier and the second cluster of nodes of the first tier.

17. The apparatus of claim 12, wherein the second cluster of nodes of the first tier forms part of the cluster of nodes of the second tier.

18. The apparatus of claim 12, wherein the second cluster of nodes of the first tier forms part of a second cluster of nodes of the second tier.

19. The apparatus of claim 12, wherein the deterministic resources include at least one of bandwidth resources or time slot resources.

20. A method, comprising:
receiving, for a multi-tier communication network including at least a first tier and a second tier, a request to support a deterministic flow, wherein the request is received by a controller configured to control a cluster of nodes of the second tier, wherein the request is received from a node operating as a cluster leader of a cluster of nodes of the first tier, wherein the cluster of nodes of the first tier forms part of the cluster of nodes of the second tier;
obtaining, by the controller based on at least one of a query to a second controller configured to control a second cluster of nodes of the second tier or a query to a second node operating as a cluster leader of a second cluster of nodes of the first tier, information indicative of deterministic resources available within the multi-tier communication network to support the deterministic flow; and sending, by the controller toward the node operating as the cluster leader of the cluster of nodes of the first tier, a response indicative as to whether the deterministic flow has been resolved within the multi-tier communication network.

* * * * *